(12) United States Patent
Yanagawa et al.

(10) Patent No.: US 7,738,069 B2
(45) Date of Patent: Jun. 15, 2010

(54) LIQUID CRYSTAL DISPLAY DEVICE

(75) Inventors: Kazuhiko Yanagawa, Mobara (JP);
Yasushi Iwakabe, Ooamishirasato (JP);
Yoshiaki Nakayoshi, Ooamishirasato (JP); Masatoshi Wakagi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 63 days.

(21) Appl. No.: 12/081,347

(22) Filed: Apr. 15, 2008

(65) Prior Publication Data

US 2008/0225223 A1 Sep. 18, 2008

Related U.S. Application Data

(60) Continuation of application No. 11/437,712, filed on May 22, 2006, now Pat. No. 7,382,432, which is a division of application No. 10/694,056, filed on Oct. 28, 2003, now abandoned, which is a division of application No. 09/948,758, filed on Sep. 10, 2001, now abandoned.

(30) Foreign Application Priority Data

Dec. 18, 2000 (JP) ............................. 2000-384173

(51) Int. Cl.
*G02F 1/1339* (2006.01)
(52) U.S. Cl. ...................................... 349/156
(58) Field of Classification Search ................. 349/156
See application file for complete search history.

(56) References Cited

U.S. PATENT DOCUMENTS

| | | | |
|---|---|---|---|
| 4,820,025 A | 4/1989 | Nakanowatari | |
| 5,680,187 A * | 10/1997 | Nagayama et al. | 349/110 |
| 5,680,189 A | 10/1997 | Shimizu et al. | |
| 5,936,689 A | 8/1999 | Saishu et al. | |
| 5,986,729 A | 11/1999 | Yamanaka et al. | |
| 6,095,203 A | 8/2000 | Yamamoto et al. | |
| 6,219,127 B1 | 4/2001 | Hirakata et al. | |
| 6,310,678 B1 | 10/2001 | Shimotoyodome | |
| 6,424,402 B1 * | 7/2002 | Kishimoto | 349/156 |
| 6,531,329 B2 | 3/2003 | Asakura et al. | |
| 6,577,374 B1 * | 6/2003 | Nakata et al. | 349/156 |

\* cited by examiner

*Primary Examiner*—James A Dudek
(74) *Attorney, Agent, or Firm*—Stites & Harbison PLLC; Juan Carlos A. Marquez, Esq.

(57) ABSTRACT

There is provided a liquid crystal display device in which light leaks near spacers are prevented. The liquid crystal display device controls the optical transmissivity of a liquid crystal layer interposed between substrates disposed in opposition to each other, by means of an electric field generated in the layer-thickness direction of the liquid crystal layer, includes spacers formed on a liquid-crystal-side surface of one of the substrates, signal lines formed on a liquid-crystal-side surface of the other substrate, an insulating film formed to cover the signal lines, and electrodes formed on the upper surface of the insulating film, each of which serves as one electrode contributing to control of the optical transmissivity of the liquid crystal layer. Each of the spacers has a vertex surface disposed in opposition to any of the signal lines, and a portion of each of the electrodes is extended to the upper surface of a corresponding one of the signal lines and the extended portion is opposed to a part of the vertex surface of a spacer disposed in opposition to the corresponding one of the signal lines.

4 Claims, 25 Drawing Sheets

Light leak area around spacer: large

GL  SP  SUB1

Light leak area around spacer: small

GL  SP  SUB1

GL  SP  SUB1

GL  SP  SUB1

W3 > 2W1 > W2 > W1

LIQUID CRYSTAL DISPLAY DEVICE

CROSS-REFERENCE TO RELATED APPLICATIONS

This application is a Continuation application of U.S. application Ser. No. 11/437,712 filed May 22, 2006, now U.S. Pat. No. 7,382,432 which is a Divisional application of U.S. application Ser. No. 10/694,056 filed Oct. 28, 2003, now abandoned which is a Divisional application of U.S. application Ser. No. 09/948,758 filed Sep. 10, 2001, now abandoned. Priority is claimed based on U.S. application Ser. No. 11/437, 712 filed May 22, 2006, which claims the priority of U.S. application Ser. No. 10/694,056 filed Oct. 28, 2003, which claims the priority U.S. application Ser. No. 09/948,758 filed Sep. 10, 2001, which claims the priority date of Japanese Patent Application No. 2000-384173 filed Dec. 18, 2000, all of which is incorporated by reference.

BACKGROUND OF THE INVENTION

1. Field of the Invention

The present invention relates to a liquid crystal display device and, more particularly, to a so-called active matrix type of liquid crystal display device.

2. Background Art

An active matrix type of liquid crystal display device includes substrates disposed in opposition to each other with a liquid crystal interposed therebetween, gate signal lines disposed to be extended in the x direction and to be juxtaposed in the y direction, drain signal lines disposed to be extended in the y direction and to be juxtaposed in the x direction, and pixel areas each constituted by an area surrounded by adjacent ones of the gate signal lines and adjacent ones of the drain signal lines on a liquid-crystal-side surface of one of the substrates.

Each of the pixel areas is provided with a switching element which is operated by a scanning signal supplied from one of the adjacent gate signal lines, and a pixel electrode which is supplied with a video signal from one of the adjacent drain signal lines via the switching element.

This pixel electrode controls the optical transmissivity of the liquid crystal by causing an electric field to be generated between the pixel electrode and a counter electrode, and two kinds of constructions are known: the first kind of construction is such that the counter electrode is formed on a liquid-crystal-side surface of the other of the substrates, while the other kind of construction is such that the counter electrode is formed on the liquid-crystal-side surface of the one of the substrates.

An electronic circuit is incorporated in the liquid-crystal-side surface of each of the substrates in the form of a stacked structure of a conductive layer, a semiconductor layer or an insulating layer formed in a predetermined pattern.

Another construction is known in which spacers are formed on the liquid-crystal-side surface of either of the substrates to realize the spacer function of ensuring the gap between the substrates disposed in opposition to each other with the liquid crystal interposed therebetween. This is because as compared with the existing beads or fibers, the spacers can be formed at predetermined positions and the uniformity of the gap between the substrates can be easily ensured.

Driver circuit ICs (driver chips) which supply signals to the gate signal lines or the drain signal lines are mounted on the one of the substrates on which the signal lines are formed. However, in recent year, a mounting method called an FCA (or COG) method has widely been adopted in which the driver chips are directly mounted in a face-down state so that their input bumps and output bumps are connected to interconnection layers (signal lines) on the substrate.

This is because the number of lines to be led to the outside can be reduced even in the case of liquid crystal display devices of higher resolution.

In a general construction for supplying signals and power to the driver chips, supply lines for signals and power are formed on a surface of a printed circuit board disposed close to the substrate, and signals and power are individually supplied to the respective driver chips through the supply lines. However, in recent years, another construction has been known in which at least either signals or power is transmitted without being passed through the printed circuit board for the purpose of a further reduction in cost.

SUMMARY OF THE INVENTION

Representative problems to be solved by the invention are as follows.

(Problem 1)

The present inventors have found out that if the gap (cell gap) between the upper and lower substrates of a liquid crystal display panel is ensured with organic material spacers formed on one of the substrates, the area of one spacer taken in a plane intersecting with its axis is larger than the area of one bead owing to the difference between the minimum sizes of spacers and beads that can be processed by exposure, so that there is the problem that a light leak area becomes larger around spacers than around beads. The present inventors have also found out that this phenomena is remarkable in the case where a TFT substrate has an organic material layer.

(Problem 2)

In an FCA type of liquid crystal display device, since driver chips are directly mounted on a substrate, the area of a portion of connection between the driver chips and the substrate is greatly reduced, so that there is the problem that a connection defect easily occurs due to foreign matter or dust.

In the FCA type, it is ordinary that the substrate and the driver chips are connected to each other via an anisotropic conductive film. However, if a defective connection occurs, repair is performed by removing the anisotropic conductive film with a solvent and mounting a new anisotropic conductive film and a new driver chip.

On the other hand, by way of experiment, the present inventors used an organic insulating film as a protective film for preventing direct contact between liquid crystal and a switching element formed in a liquid crystal display part, and extended the organic insulating film into an area in which drivers chips are mounted.

In this case as well, the present inventors have found out the problem that when the above-described anisotropic conductive film is removed during repair, the organic insulating film may peel nonuniformly. The present inventors have also found out that even if such a problem is not caused, the organic insulating film melts by the solvent and forms a thin insulating layer on a terminal part and this thin insulating layer increases the connection resistance between driver chips and interconnection layers.

(Problem 3)

In the FCA type of liquid crystal display device, since the driver chips are directly mounted on the substrate, there is the problem that if an excessive vibration or shock is applied to the liquid crystal display device, the vibration or shock cannot be easily absorbed, so that the driver chips easily malfunction.

In the FCA type of liquid crystal display device, the substrate on which the driver chips are mounted in many cases uses a substrate disposed on a side remote from an observer side. The reason for this is to avoid optical reflection due to various signal lines formed on the liquid crystal display part of the substrate.

In the case where the driver chips are covered with a frame which constitutes part of a so-called liquid crystal display module, the driver chips are disposed in opposition to the frame, and the present inventors have discovered that if, for example, a pressure is applied to the frame to such an extent that the frame is deformed, there is the problem that the pressure reaches the driver chips and causes malfunction thereof.

(Problem 4)

As described above, during the experiment of using the organic insulating film as the protective film of the liquid crystal display part, the present inventors have found out that the problem that the organic insulating film has the nature of easily absorbing moisture and generating gases, and generates bubbles in the liquid crystal.

Many of the bubbles are generated on the side of the liquid crystal display part that is remote from an liquid crystal injection hole, and large bubbles appear in a liquid crystal display area.

(Problem 5)

In the case where the gap between the upper and lower substrates of the liquid crystal display panel is ensured with organic material spacers formed on one of the substrates, the spacer are in contact with the other substrate at fixed positions. For this reason, vibration and shock applied to the liquid crystal display device concentrate on the positions.

In this case, if the spacers are provided on the substrate on which the interconnection layers are provided, the spacers themselves serve as a layer which absorbs shock and the area required to fix each of the spacers becomes comparatively large, whereby it is possible to prevent an influence such as disconnection of the interconnection layers.

However, if the spacers are provided on the substrate other than the substrate on which the interconnection layers are provided, the area of contact between the substrate and the vertex side of each of the spacers is comparatively small and pressure or shock concentrates at the location where each of the substrates is in contact with the substrate. If an interconnection layer is formed in this portion, there occurs the problem of disconnection of the interconnection layer.

(Problem 6)

If a driver is to be mounted on a substrate, the driver needs to be accurately mounted, and an alignment mark is formed on the substrate for this purpose.

However, the present inventors have found out a new problem that in the case where a stacked structure in which an inorganic material layer and an organic material layer are stacked in that order is used as a protective film, a sharp image of the alignment mark cannot be recognized, so that accurate alignment becomes difficult.

In the case of FCA mounting of drivers on a substrate, the pitch of terminals is narrow, and more accurate alignment is required. However, in the case where a protective film is formed of the above-described stacked structure, it becomes extremely difficult to recognize an alignment mark, particularly in a reflection mode.

(Problem 7)

As a method of supplying signals or power to drivers (chips) mounted on a substrate at far lower cost, a method is becoming developed which enables at least either power or signals to be transmitted between chips without being passed through a printed circuit board (PCB).

However, in this method, it is necessary to provide transmission lines for at least either power or signals between the chips on the substrate, and the distance of the transmission lines becomes extremely long.

In general, an interconnection line extended from a liquid crystal display part to a terminal part passes by only a slight length through an environment where the interconnection line is exposed to moisture in the air, but the length by which the transmission lines pass through such an environment is several times to several tens times, as compared with the interconnection line.

From this fact, the degradation of the transmission lines is a serious problem and there is a risk that electrolytic corrosion occurs, particularly in a power transmission line. As countermeasures against such a problem, the present inventors are presently making an attempt at forming only signal lines on a substrate and leading a power source line from a PCB.

However, this method is insufficient in its cost-reducing effect which is the original purpose, and it is becoming necessary to dispose not only signal lines but a power source line on a substrate in such a way that a decrease in reliability can be avoided.

The invention has been made to solve the above-described problems.

An object of the invention is to provide a liquid crystal display device in which light leaks occurring at the peripheries of spacers for ensuring its cell gap are reduced.

Another object of the invention is to provide a liquid crystal display device in which it is possible to perform reliable repairs of driver chips mounted on a surface of one of substrates disposed in opposition to each other with a liquid crystal interposed therebetween.

Another object of the invention is to provide a liquid crystal display device in which vibration or shock to be applied to driver chips is mitigated to prevent malfunction of the driver (hips.

Another object of the invention is to provide a liquid crystal display device in which troubles of bubbles generated in its liquid crystal are solved.

Another object of the invention is to provide a liquid crystal display device in which signal lines or the like in indirect contact with spacers for ensuring its cell gap are prevented from being damaged by vibration or shock concentrating on the spacers.

Another object of the invention is to provide a liquid crystal display device provided with reliable alignment marks.

Another object of the invention is to provide a liquid crystal display device in which it is possible to form interconnection layers free from damage due to electrolytic corrosion or the like in the vicinity of a region in which driver chips are mounted.

Representative aspects of the invention disclosed in the present application will be described below in brief.

(Aspect 1)

The invention provides a liquid crystal display device which controls the optical transmissivity of a liquid crystal layer interposed between substrates disposed in opposition to each other, by means of an electric field generated in the layer-thickness direction of the liquid crystal layer, including:

spacers formed on a liquid-crystal-side surface of one of the substrates;

signal lines formed on a liquid-crystal-side surface of the other substrate;

an insulating film formed to cover the signal lines; and electrodes formed on the upper surface of the insulating film, each of which serves as one electrode contributing to control of the optical transmissivity of the liquid crystal layer, each of the spacers having a vertex surface disposed in opposition to any of the signal lines, a portion of each of the electrodes being extended to the upper surface of a corresponding one of the signal lines and the extended portion being opposed to a part of the vertex surface of a spacer disposed in opposition to the corresponding one of the signal lines.

(Aspect 2)

The invention provides a liquid crystal display device including:

a plurality of patterned material layers stacked on a liquid-crystal-side surface of one of substrates disposed in opposition to each other with a liquid crystal interposed therebetween, the material layers including at least a conductive layer formed as signal lines and an organic material layer formed as an insulating layer; and driver chips mounted on the liquid-crystal-side surface of the one of the substrates to supply signals from terminals of the signal lines;

the driver chips having bumps provided in electrical connection with the terminals via an anisotropic conductive film interposed between the one of the substrates and the driver chips, an area in which the driver chips are mounted being a non-formation region of the organic material layer.

(Aspect 3)

The invention provides a liquid crystal display device including:

a plurality of patterned material layers stacked on a liquid-crystal-side surface of one of substrates disposed in opposition to each other with a liquid crystal interposed therebetween, the material layers including at least a conductive layer formed as signal lines;

driver chips mounted on the liquid-crystal-side surface of the one of the substrates to supply signals from terminals of the signal lines; and a shock absorbing layer interposed between the driver chips and the one of the substrates.

(Aspect 4)

The invention provides a liquid crystal display device including:

a pair of substrates disposed in opposition to each other with a liquid crystal interposed therebetween;

a sealing material which secures one of the substrates to the other and seals the liquid crystal; and an organic material layer formed in at least an area surrounded by the sealing material on the one of the substrates, a non-formation region of the organic material layer being provided in the vicinity of the sealing material.

(Aspect 5)

The invention provides a liquid crystal display device including:

substrates disposed in opposition to each other with a liquid crystal interposed therebetween;

signal lines formed on one of the substrates;

a stacked structure formed to cover the signal lines on the one of the substrates, an inorganic material layer and an organic material layer being stacked in that order in the stacked structure; and spacers formed on the one of the substrates to ensure the gap between the one of the substrates and the other, the spacers being formed to be superposed on the signal lines with the stacked structure being interposed therebetween.

(Aspect 6)

The invention provides a liquid crystal display device including:

substrates disposed in opposition to each other with a liquid crystal interposed therebetween;

driver chips mounted on one of the substrates in an area other than an area in which the liquid crystal is sealed;

the driver chips being electrically connected to signal lines formed to run in an area in which the liquid crystal is sealed, with a stacked structure being interposed between the driver chips and the signal lines, an inorganic material layer and an organic material layer being stacked in that order in the stacked structure; and an alignment mark formed in a layer underlying the stacked structure in the vicinity of each of the driver chips, the inorganic material layer which covers the alignment mark being left in a shape which is coaxially coincident with the alignment mark and is similar to, but larger than, the alignment mark, the vicinity of the inorganic material layer being removed.

(Aspect 7)

The invention provides a liquid crystal display device including:

substrates disposed in opposition to each other with a liquid crystal interposed therebetween;

driver chips mounted on one of the substrates in an area other than an area in which the liquid crystal is sealed;

the driver chips being electrically connected to signal lines formed to run in an area in which the liquid crystal is sealed, with an organic material layer being interposed between the driver chips and the signal lines; and an interconnection layer formed to run in an area in which the driver chips are mounted, in a layer underlying the organic material layer.

BRIEF DESCRIPTION OF THE DRAWINGS

The invention will become more readily appreciated and understood from the following detailed description of preferred embodiments of the invention when taken in conjunction with the accompanying drawings, in which.

DETAILED DESCRIPTION OF THE INVENTION

Preferred embodiments of the liquid crystal display device according to the invention will be described below with reference to the accompanying drawings.

Embodiment 1

Equivalent Circuit of Liquid Crystal Display Device

Figure 2:
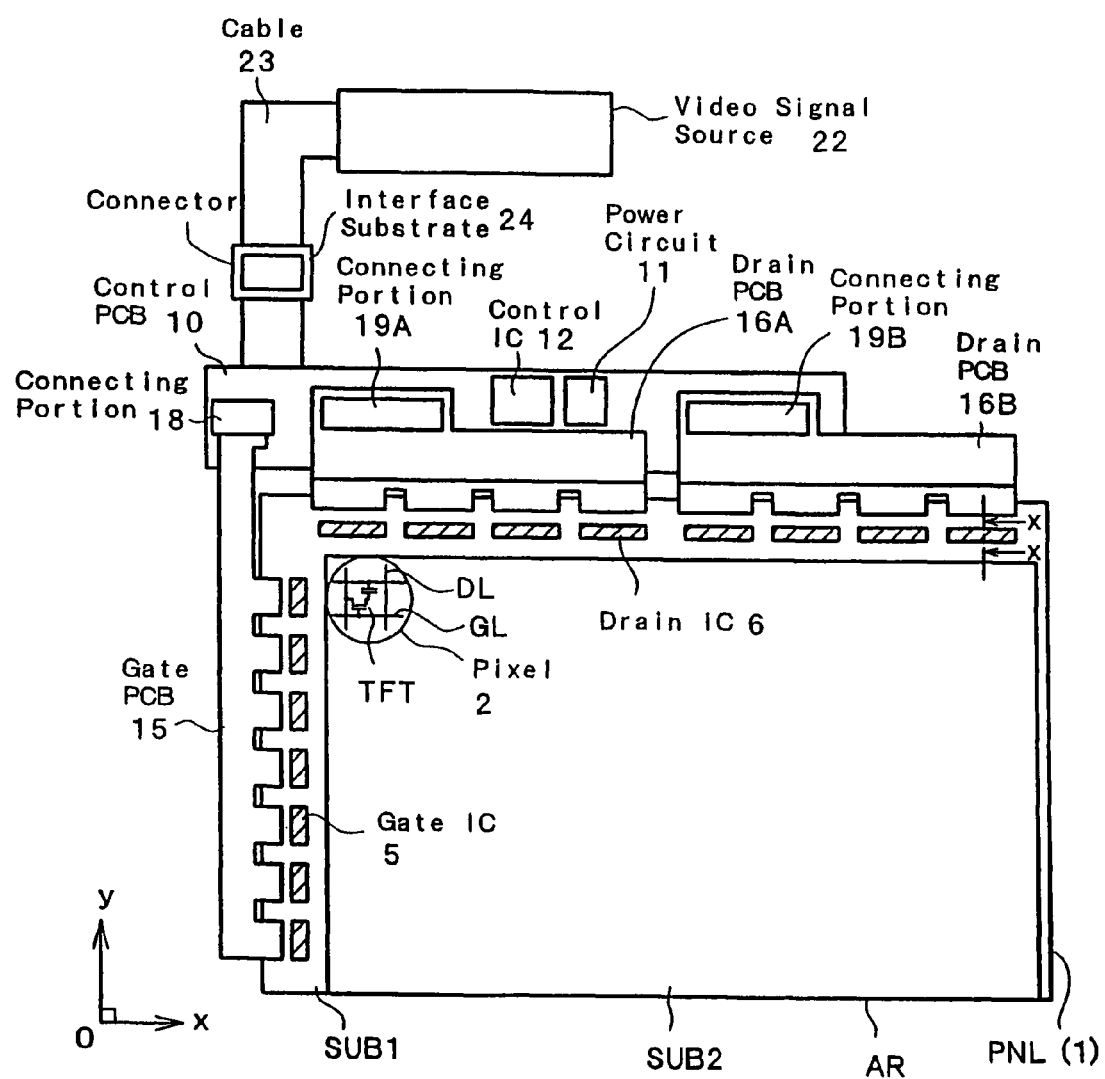
FIG. 2 is a view showing the entire construction of one embodiment of the liquid crystal display device according to the invention.

FIG. 2 is an equivalent circuit diagram showing one embodiment of the liquid crystal display device according to the invention. FIG. 2 is a circuit diagram which is depicted to correspond to an actual geometrical arrangement.

In Embodiment 1, the invention is applied to a liquid crystal display device adopting a so-called in-plane-switching mode which is known as a mode having a wide viewing angle.

In FIG. 1, there is shown a liquid crystal display panel PNL. This liquid crystal display panel PNL has a vessel made of transparent substrates SUB1 and SUB2 disposed in opposition to each other with a liquid crystal interposed therebetween. In this case, one of the transparent substrates (in FIG. 2, a lower substrate: a matrix substrate) is formed to be slightly larger in size than the other transparent substrate (in FIG. 2, an upper substrate: a color filter substrate). As shown in FIG. 2, the transparent substrates SUB1 and SUB2 are disposed in such a manner that the bottom and right peripheral edges of one of the transparent substrates SUB1 and SUB2 approximately coincide with those of the other.

Accordingly, as viewed in FIG. 2, the left and top peripheries of the transparent substrate SUB1 are disposed to be extended outwardly from those of the other transparent substrate SUB2. As will be described later in detail, the portion of the transparent substrate SUB1 that is disposed to be extended outwardly from the transparent substrate SUB1 is used as an area in which gate driver ICs 5 and drain driver ICs 6 are mounted as driver chips.

Pixels 2 are disposed in matrix form in the area in which the transparent substrates SUB1 and SUB2 are superposed on each other. Gate signal lines GL are disposed to be extended in the x direction and to be juxtaposed in the y direction as viewed in FIG. 2, while drain signal lines DL are disposed to be extended in the y direction and to be juxtaposed in the x direction as viewed in FIG. 2, and the respective pixels 2 are formed in areas each of which is surrounded by adjacent ones of the gate signal lines GL and adjacent ones of the drain signal lines DL. Each of the pixels 2 is provided with at least a switching element TFT to be driven by the supply of a scanning signal from one of the adjacent gate signal lines GL, and a pixel electrode PX to which a video signal to be supplied from one of the adjacent drain signal lines DL via this switching element TFT is applied.

In Embodiment 1, each of the pixels 2 is of the type which adopts the so-called in-plane-switching mode as described above, and is also provided with a reference electrode CT and a charge-holding element Cstg in addition to the switching element TFT and the pixel electrode PX, as will be described later Each of the gate signal lines GL has one end (in FIG. 2 the left-hand end) disposed to be extended to the periphery of the transparent substrate SUB1, and is connected to the output terminal of the corresponding one of the gate driver ICs 5 mounted on the transparent substrate SUBI.

In this case, plural gate driver ICs 5 are disposed, and the gate signal lines GL are divided into groups each including mutually adjacent gate signal lines GL (refer to FIG. 36A) and the gate signal lines GL of each of the groups is connected to the proximate one of the gate driver ICs 5.

Similarly, each of the drain signal lines DL has one end (in FIG. 2, the top end) disposed to be extended to the periphery of the transparent substrate SUB1, and is connected to the output terminal of the corresponding one of the drain driver ICs 6 mounted on the transparent substrate SUB1.

In this case, plural drain driver ICs 6 are disposed, and the drain signal lines DL are divided into groups each including mutually adjacent drain signal lines DL and the drain signal lines DL of each of the groups is connected to the proximate one of the corresponding one of the drain driver ICs 6.

A printed circuit board 10 (a control circuit board 10) is disposed in proximity to the liquid crystal display panel PNL on which the gate driver ICs 5 and the drain driver ICs 6 are mounted in the above-described manner, and a control circuit 12 for supplying input signals to the gate driver ICs 5 and the drain driver ICs 6 is mounted on the control circuit board 10 in addition to a power source circuit 11 and others.

Signals from the control circuit 12 are supplied to the gate driver ICs 5 and the drain driver ICs 6 via flexible printed wiring boards (a gate circuit board 15, a drain circuit board 16A and a drain circuit board 16B).

Specifically, a flexible printed wiring board (the gate circuit board 15) which is provided with terminals appositely connected to the input terminals of the respective gate driver ICs 5 is arranged on the side of the gate driver ICs 5.

A portion of the gate circuit board 15 is formed to be extended to the control circuit board 10, and the gate circuit board 15 is connected to the control circuit board 10 via a connecting part 18 at the extended portion.

The output signals from the control circuit 12 mounted on the control circuit board 10 are inputted to the respective gate driver ICs 5 via interconnection layers on the control circuit board 10, the connecting part 18 and interconnection layers on the gate circuit board 15.

The drain circuit boards 16A and 16B each of which is provided with terminals appositely connected to the input terminals of the respective drain driver ICs 6 are disposed on the side of the drain driver ICs 6.

Portions of the drain circuit boards 16A and 16B are formed to be extended to the control circuit board 10, and are connected to the control circuit board 10 via connecting parts 19A and 19B at the extended portions, respectively.

The output signals from the control circuit 12 mounted on the control circuit board 10 are inputted to the drain driver circuits 16A and 16B via the interconnection layers on the control circuit board 10, the respective connecting parts 19A and 19B, and interconnection layers on the respective drain circuit boards 16A and 16B.

The drain circuit boards 16A and 16B on the side of the drain driver ICs 6 are provided as two separate circuit boards, as shown in FIG. 2. This is intended to prevent, for example, harmful effects caused by thermal expansion due to an increase in the x direction of FIG. 1 in the length of either of the drain circuit boards 16A or 16B which accompanies an increase in the size of the liquid crystal display panel PNL.

The output signals from the control circuit 12 mounted on the control circuit board 10 are inputted to the corresponding drain driver ICs 6 via the connecting part 19A of the drain circuit board 16A and the connecting part 19B of the drain circuit board 16B.

In addition, a video signal is supplied from a video signal source 22 to the control circuit board 10 through a cable 23 via an interface circuit board 24, and is inputted to the control circuit 12 mounted on the control circuit board 10.

In FIG. 2, the liquid crystal display panel PNL, the gate circuit board 15, the drain circuit boards 16A and 16B and the control circuit board 10 are shown to be positioned in approximately the same plane. Actually, the control circuit board 10 is bent at a portion where the gate circuit board 15 and the drain circuit boards 16A and 16B are mounted, and is positioned at approximately right angles to the liquid crystal display panel PNL.

This construction is intended to reduce the area of a so-called picture frame. The term "picture frame" used herein means the area between the outline of the outer frame of the liquid crystal display panel PNL and the outline of a display area AR, and by reducing this area, it is possible to obtain the advantage of increasing the area of a display part with respect to the outer frame.

<<Construction of Pixel>>

Figure 1A:
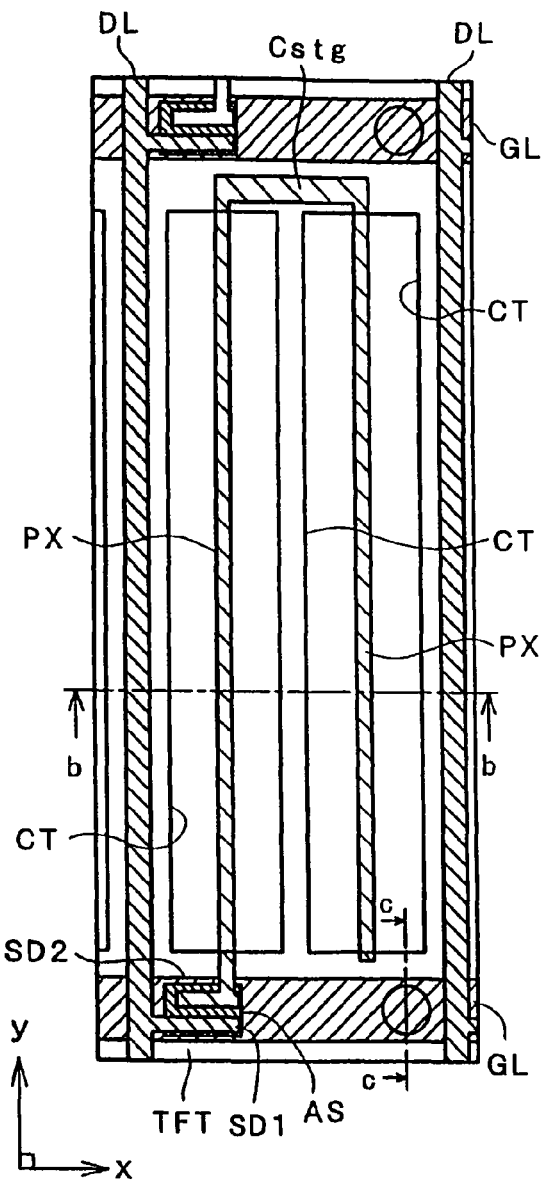
FIGS. 1A, 1B and 1C are construction views showing one embodiment of a pixel area of the liquid crystal display device according to the invention.
Figure 1B:
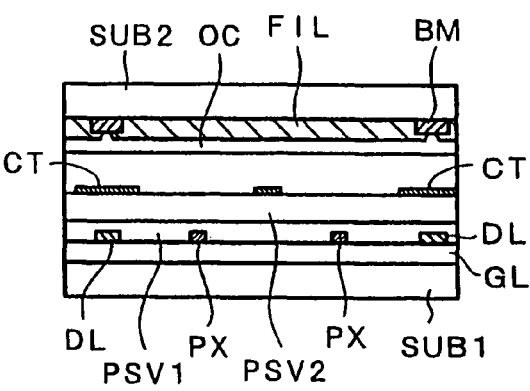
Figure 1C:
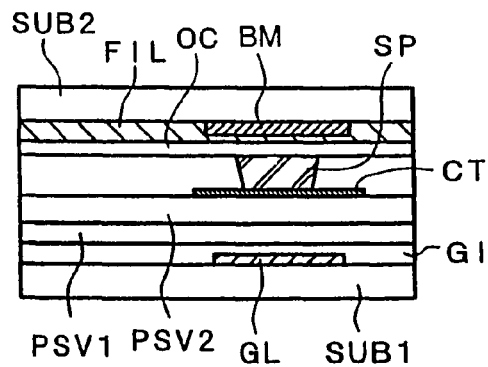

As described above, the liquid crystal display panel PUL has the liquid display area AR made of multiple pixels 2 disposed in matrix form, and the construction of one of the pixels 2 is as shown in FIG. 1A. FIG. 1B is a cross-sectional view taken along line b-b of FIG. 1A, and FIG. 1C is a cross-sectional view taken along line c-c of FIG. 1A.

As shown in FIG. 1A, the gate signal lines GL which are disposed to be extended in the x direction and juxtaposed in the y direction are formed on the main surface of the transparent substrate SUB1. The area surrounded by the gate signal lines GL and the drain signal lines DL is formed as a pixel area.

An insulating film GI made of, for example, silicon nitride film is formed to cover the gate signal lines GL and others on the main surface of the transparent substrate SUB1 on which the gate signal lines GL are formed in the above-described manner. This insulating film GI has the function of an interlayer insulating film between the gate signal lines GL and the drain signal lines DL which will be described later, the function of gate insulating films for thin film transistors TFT which will be described later, and the function of dielectric films for charge-holding elements Cstg which will be described later.

On the surface of the insulating film GI, a semiconductor layer AS is formed in an area in which the thin film transistor TFT is formed. This semiconductor layer AS is made of, for example, amorphous Si, and is formed to be superimposed on one of the gate signal lines GL in a portion close to one of the drain signal lines DL which will be described later. Thus, part of the gate signal line GL serves as the gate electrode of the thin film transistor TFT.

The drain signal lines DL which are extended in the y direction and juxtaposed in the x direction are formed on the surface of the insulating film GI. Each of the drain signal lines DL is integrally provided with a drain electrode SD1 which is formed to extend into a portion of the surface of the semiconductor layer AS which constitutes the thin film transistor TFT.

Furthermore, a source electrode SD2 of the thin film transistor TFT is formed on the surface of the insulating film GI in the pixel area at the same time that the drain electrode SD1 is formed, and the pixel electrodes PX are formed integrally with the source electrode SD2.

Incidentally, the surface of the semiconductor layer AS which corresponds to the interface between the drain electrode SD1 and the source electrode SD2 of the thin film transistor TFT is doped with phosphorus (P) to form a high-concentration layer, thereby providing ohmic contact at each of the drain electrode SD1 and the source electrode SD2. The high-concentration layer is formed on the entire surface of the semiconductor layer AS, and after the drain electrodes SD1 and the source electrodes SD2 have been formed, these electrodes SD1 and SD2 are used as a mask to etch the high-concentration layer except the area in which the electrodes SD1 and SD2 are formed, thereby forming the above-described construction.

The pixel electrode PX is connected at one end to the source electrode SD2 of the thin film transistor TFT. The pixel electrode PX is formed to be extended from the one end in the y direction toward the other gate signal line GL different from the gate signal line GL which drives the thin film transistor TFT, and is further extended in the x direction along the other gate signal line GL, and is again extended in the y direction, thereby forming a C-like shape.

Specifically, the pixel electrode PX is formed as two pixel electrodes in the pixel area by being extended back and forth in the y direction as viewed in FIG. 1A, and these pixel electrodes PX are connected to each other in the vicinity of the gate signal line GL.

A protective film PSV is formed to cover the drain signal lines DL, the pixel electrodes PX and others on the surface of the transparent substrate SUB1 on which the drain signal lines DL and the pixel electrodes PX are formed. In Embodiment 1, this protective film PSV is made of a stacked structure in which a protective film PSV1 which is an inorganic material layer made of, for example, a silicon nitride film and a protective film PSV2 which is an organic material layer made of a resin layer or the like are stacked in that order.

The reason why the protective film PSV is made of the stacked structure including the organic material layer in this manner is to decrease the dielectric constant of the protective film PSV itself.

The formation of the protective film PSV is to prevent characteristic degradation due to the direct contact between the thin film transistor TFT and the liquid crystal.

The reference electrode CT is formed on the upper surface of the protective film PSV (exactly, the protective film PSV2 made of the organic material layer).

In Embodiment 1, the reference electrode CT is formed of a transparent conductive film made of, for example, an ITO (Indium-Tin-Oxide) film, and is formed as three electrodes two of which are positioned on the opposite sides of each of the two pixel electrodes PX.

Specifically, one of the three reference electrodes CT is formed to run through the central portion of the pixel axis in the y direction as viewed in FIG. 1A, and the other two are formed to run along the upper surfaces of the respective drain signal lines DL.

By forming the reference electrodes CT over the respective drain signal lines DL, an electric field generated from each of the drain signal lines DL can be terminated at the corresponding one of the reference electrodes CT, whereby it is possible to achieve the advantage of preventing the electric fields from applying noise to the pixel electrodes PX.

For this reason, in Embodiment 1, the respective reference electrodes CT are formed to fully cover the drain signal lines DL, and the widths of the respective reference electrodes CT are made larger than those of the drain signal lines DL.

Although in Embodiment 1 the reference electrodes CT are made of the transparent conductive film, the material of the reference electrodes CT need not be limited to the transparent conductive film. The reference electrodes CT may also be formed of an opaque conductive film such as a metal film. In this case, by forming the reference electrodes CT on the respective drain signal lines DL, it is possible to achieve the advantage of improving the aperture ratio of the pixel area.

Furthermore, the reference electrodes CT are formed as part of the transparent conductive film formed to fully cover the gate signal lines GL.

Owing to this construction, the transparent conductive film can be integrally formed in each of adjacent pixel areas, whereby reference voltage signals can be supplied to the reference electrodes CT which are part of the transparent conductive film, via the transparent conductive film.

Accordingly, reference voltage signal lines which run through the pixel areas need not be specially formed, whereby it is possible to improve the aperture ratio of each of the pixel areas.

However, in the case where reference voltage signal lines are formed in a layer different from the reference electrodes CT as another embodiment, the connection between the reference voltage signal lines and the reference electrodes CT may also be realized via through holes.

If the liquid crystal display device is constructed to operate in a so-called normally black mode in which the optical transmissivity of the liquid crystal is minimized when no electric fields occur between the pixel electrodes PX and the reference electrodes CT, the above-described transparent conductive film can be made to function as a light shielding film.

In portions close to the drain signal lines DL or the gate signal lines GL, the liquid crystal is driven by electric fields generated from the drain signal lines DL or the gate signal lines GL, so that light leak easily occur. However, since the transparent conductive film is made to function as a light shielding film, the reliability of display can be improved.

Incidentally, the transparent conductive film formed to fully cover the gate signal lines GL is also formed to cover a portion of the pixel electrodes PX (the connection portion of the two pixel electrodes PX extended in the y direction as viewed in FIG. 1A), and the charge-holding element Cstg is formed in the portion of superposition between the transparent conductive film and the pixel electrodes PX.

This charge-holding element Cstg has the effect of storing a video signal in the pixel electrodes PX for a long time, for example when the thin film transistor TFT is turned off.

An alignment film (not shown) is formed to cover the reference electrodes CT and others on the surface of the transparent substrate SUB1 on which the reference electrodes CT are formed in the above-described manner. The alignment film is a film which is in direct contact with the liquid crystal and determines the initial alignment direction of the liquid crystal.

Incidentally, in Embodiment 1, the pixel electrodes PX are formed of the same material as the drain signal lines DL. However, the invention is not limited to such an example, and the pixel electrodes PX may also be formed of a transparent conductive film. According to this construction, the aperture ratio of the pixel area is improved.

The transparent substrate SUB1 constructed in the above-described manner is disposed in opposition to the glass substrate SUB2 with the liquid crystal interposed therebetween, and a black matrix BM which has apertures in portions corresponding to the respective pixel areas is formed on a liquid-crystal-side surface of the transparent substrate SUB2.

In the case where the transparent conductive film a portion of which forms the reference electrodes CT as described above is given the light shielding function (a construction for so-called normally black mode is adopted), the black matrix BM can be made narrower than black matrices based on related arts, whereby the aperture ratio of the pixel area can be improved. This is because it becomes comparatively less necessary to consider the deviation of adjustment of the transparent substrate SUB1 and the transparent substrate SUB2.

Furthermore, color filters FIL are formed to cover the apertures formed in the portions of the black matrix BM which correspond to the respective pixel areas. These color filters FIL have colors (R, G and B) which differ between adjacent pixel areas in the x direction, and the respective color filters FIL have boundaries on the black matrix BM.

A leveling film OC made of resin film or the like is formed on the surface on which the black matrix BM and the color filters FIL are formed in this manner, and spacers SP are formed on part of the leveling film OC.

These spacers SP are provided for ensuring the gap between the transparent substrate SUB1 and the transparent substrate SUB2 in the liquid crystal display area AR, and are formed by subjecting, for example, a resin material layer formed on the transparent substrate SUB2 to selective etching using photolithography techniques.

These spacers SP are disposed so that their vertex surfaces are opposed to the transparent conductive film a part of which forms the gate signal lines GL and the reference electrodes CT.

As described above, the transparent conductive film is formed to fully cover the gate signal lines GL; that is to say, the width of the transparent conductive film is fully larger than that of each of the gate signal lines GL, so that peripheral areas which are sufficiently larger in diameter than the respective spacers SP formed to be superposed on the gate signal lines GL are covered with the transparent conductive film.

This construction makes it possible to prevent light leaks from being caused at the peripheries of the respective spacers SP by a domain due to the disorder of alignment of the liquid crystal at the peripheries of the respective spacers SP. This is because the transparent conductive film a part of which forms the reference electrodes CT can function as a light shielding film.

In this case, the transparent conductive film which covers the gate signal lines GL also has the function of shielding the pixel electrodes PX from electric fields generated from the gate signal lines GL, but if these electric fields leak from the transparent conductive film (enter the pixel areas by passing the periphery of the transparent conductive film), the influence due to the domain at the peripheries of the spacers SP will spread.

A method of restraining the influence due to the domain at the periphery of each of the spacers SP will be described below.

Figure 3:
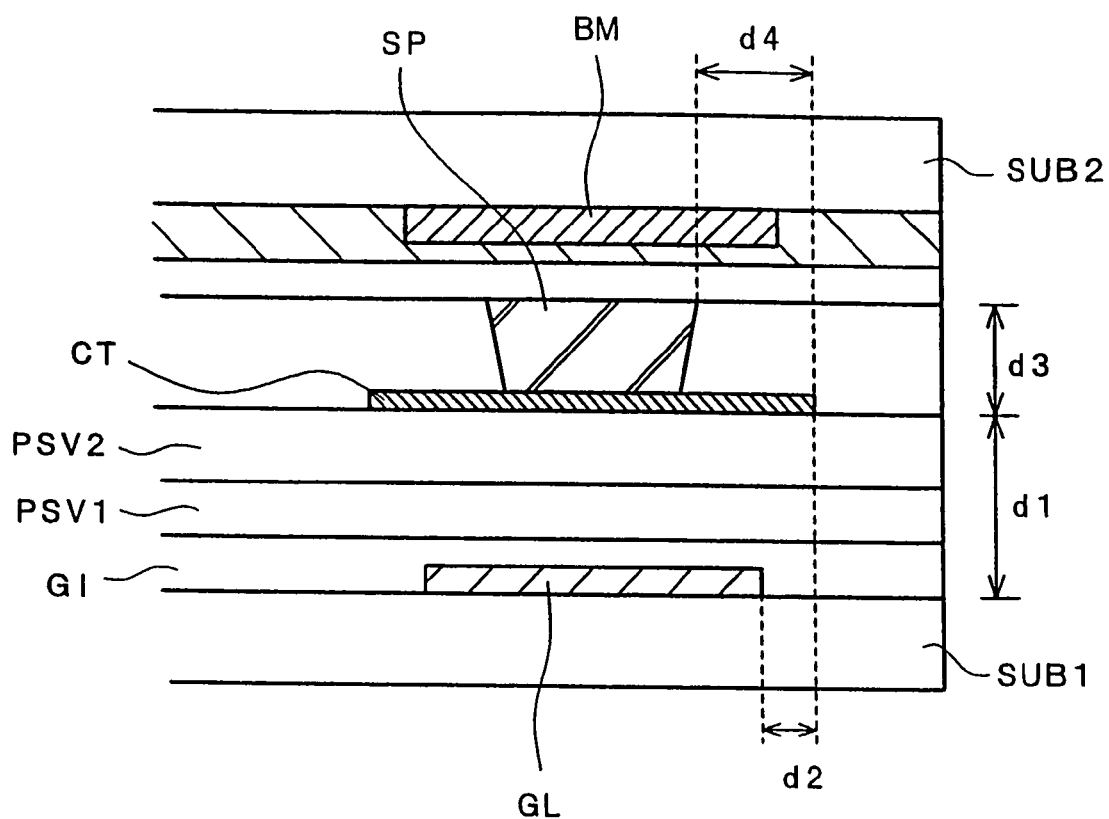
FIG. 3 is a view showing the essential construction of one embodiment of a spacer and the vicinity of the spacer in the liquid crystal display device according to the invention.

As shown in FIG. 3, letting d, be the thickness of the insulating film between the gate signal line GL and the transparent conductive film a part of which has the reference electrode CT, and letting $d_3$ be the layer thickness of the liquid crystal, it has been confirmed that if an electric field generated from the gate signal line GL is to be prevented from influencing the periphery of the spacer SP, the amount of projection of the transparent conductive film, a part of which has the counter electrode CT, from the gate signal line GL is preferably set as expressed by the following expression (1):

$$d_2 > d_1 \text{ times} \cdot \{\text{square root}\} d_3 \tag{1}$$

In addition, if the value of $d_2$ is set to 4.7 μm, it is possible to realize restraint of domains in nearly all constructions.

Accordingly, by setting the width of the transparent conductive film so that the transparent conductive film projects by 4.7 μm or more from each of the extending sides of the gate signal line GL, it is possible to nearly completely block light leak due to a domain occurring at the periphery of the spacer SP.

Incidentally, in Embodiment 1, the spacers SP are provided at locations superposed on the gate signal lines GL, but the invention is not limited to such an example and the spacers SP may also be provided at locations superposed on the drain signal lines DL.

In this case as well, by setting the width of the transparent conductive film so that the transparent conductive film projects by 4.7 μm or more from each of the extending sides of the drain signal line GL, it is possible to nearly completely block light leak due to a domain occurring at the periphery of the spacer SP.

In addition, even if the spacers SP are disposed on the transparent substrate SUB1, it is possible to obtain an advantage similar to that of Embodiment 1.

In addition, in the above expression (1), if the amount of projection of the transparent conductive film, a part of which has the reference electrode CT, from the spacer SP is made $d_4$, it is desirable to set the value of $d_4$ to obtain $d_4>d_2$.

In addition, although in Embodiment 1 the spacers SP are provided on the transparent substrate SUB2, the spacers SP may also be provided at corresponding locations on the transparent substrate SUB1. It goes without saying that this construction can also serve a similar advantage. In this case, the bottom of each of the spacers SP, that is, the vicinity of the surface of each of the spacers SP that is fixed to the transparent substrate SUB1, has a construction similar to that in the vicinity of the vertex surface of each of the above-described spacers SP of Embodiment 1.

Embodiment 2

Figure 4A:
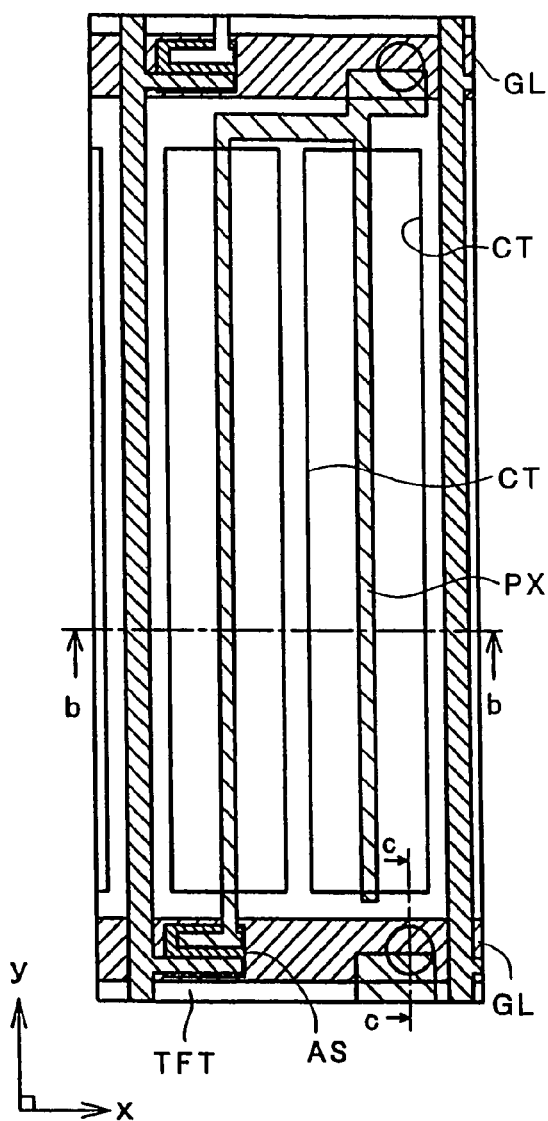
FIGS. 4A, 4B and 4C are construction views showing another embodiment of a pixel area of the liquid crystal display device according to the invention.
Figure 4B:
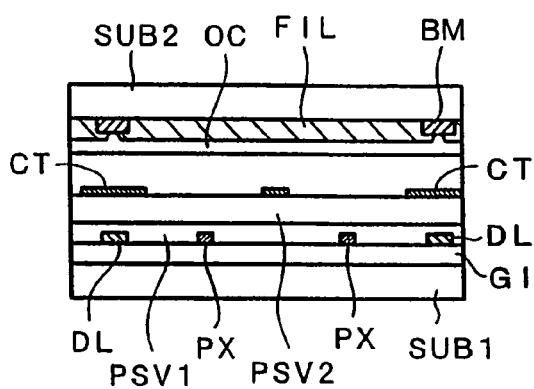
Figure 4C:
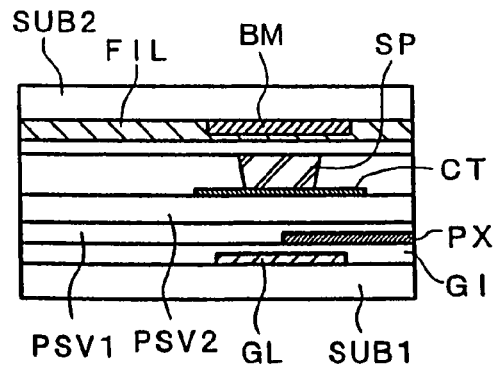

FIGS. 4A to 4C are construction views showing another embodiment of the liquid crystal display device according to the invention, and corresponds to FIGS. 1A to 1C.

The construction shown in FIGS. 4A to 4C differs that shown in FIGS. 1A to 1C in that part of the pixel electrodes PX is extended to be superposed on one of the gate signal lines GL and the area of the superposed portion of the pixel electrodes PX is made comparatively wide.

Accordingly, the charge-holding element Cstg is formed between the pixel electrodes PX and the reference electrodes CT, and a capacitance element Cadd is also formed between the pixel electrodes PX and the gate signal line GL.

In addition, since the capacitance element Cadd is formed in the area in which the charge-holding element Cstg is formed, the capacitance of the capacitance element can be increased without increasing the area occupied by the capacitance element.

Incidentally, in this case, it becomes necessary to consider the width of the transparent conductive film, in order that electric fields generated from the pixel electrodes PX which form the capacitance element Cadd be prevented from leaking from the transparent conductive film, a part of which has the reference electrodes CT, and causing the disorder of alignment of the liquid crystal at the periphery of the spacer SP.

Specifically, in the case where the extended portion of the pixel electrodes PX that is superposed on the gate signal line GL is preset at the location where the spacer SP is disposed, the width of the transparent conductive film is set so that the transparent conductive film projects by 4.7 μm or more from each of the extending sides of the gate signal line GL and each of the external sides of the extended portion. Accordingly, it is possible to nearly completely block light leak due to a domain occurring at the periphery of the spacer SP.

In addition, even if the spacers SP are disposed on the transparent substrate SUB1, the advantage of Embodiment 2 can be similarly obtained.

Embodiment 3

Figure 5A:
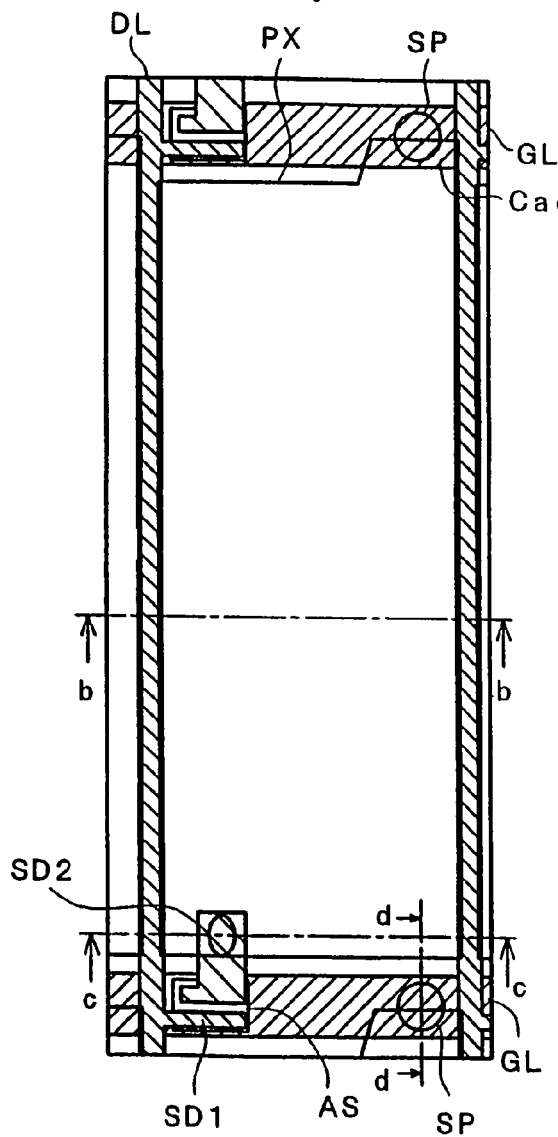
FIGS. 5A, 5B and 5C are construction views showing another embodiment of a pixel area of the liquid crystal display device according to the invention.
Figure 5B:
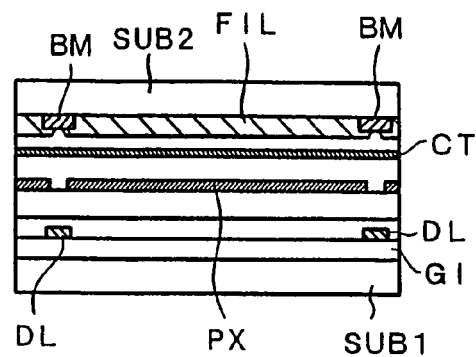
Figure 5C:
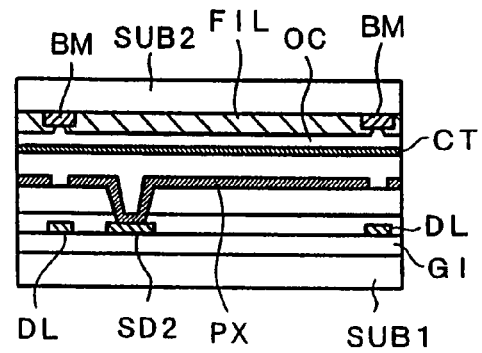
Figure 5D:
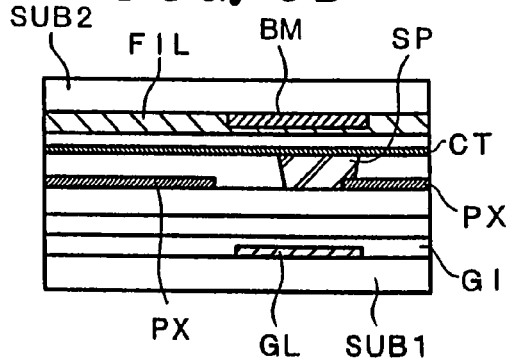
FIG. 5D is a cross-sectional view taken along line d-d of FIG. 5A.

FIG. 5A shows the construction of a liquid crystal display device having pixels constructed in a so-called vertical electric field mode. FIG. 5B is a cross-sectional view taken along line b-b of FIG. 5A, FIG. 5C is a cross-sectional view taken along line c-c of FIG. 5A, and FIG. 5D is a cross-sectional view taken along line d-d of FIG. 5A.

Unlike the construction for the in-plane-switching mode described previously in Embodiment 1, the construction for the vertical electric field mode is provided with pixel electrodes PX and a counter electrode CT which are respectively made of transparent conductive films, and the pixel electrodes PX are formed in a planar manner in the respective pixel areas on the liquid-crystal-side surface of the transparent substrate SUB1, while the counter electrode CT is formed in common with each of the pixel areas on the liquid-crystal-side surface of the transparent substrate SUB2.

Similarly to the case of Embodiment 1, the gate signal lines GL, the insulating film GI, the thin film transistors TFT and the drain signal lines DL are sequentially formed on the liquid-crystal-side surface of the transparent substrate SUB1.

Unlike the construction of Embodiment 1, contact holes for exposing part of the source electrodes SD2 of the respective thin film transistors TFT (that are formed at the same time that the drain signal lines DL are formed) are formed in the protective film PSV formed to cover the thin film transistors TFT, and the pixel electrodes PX formed on the upper surface of the protective film PSV are respectively connected to the source electrode SD2 through the contact holes.

Incidentally, in Embodiment 3 as well, the protective film PSV is made of a stacked structure in which a protective film PSV1 made of an inorganic material layer and a protective film PSV2 made of an organic material layer are stacked in that order so that the dielectric constant of the protective film PSV itself is decreased.

Each of these pixel electrodes PX is extended to be partly superposed on the other gate signal line GL different from the gate signal line GL which drives the thin film transistor TFT, thereby forming the capacitance element Cadd in the superposed portion.

The counter electrode CT is formed in common with each of the pixel areas on the surface of the leveling film OC formed on the liquid-crystal-side surface of the transparent substrate SUB2.

The spacers SP are provided on the surface of the transparent substrate SUB2 on which the counter electrode CT is formed, so that the spacers SP are be completely opposed to the corresponding ones of the gate signal lines GL and are partly opposed to the corresponding ones of the extended portions of the pixel electrodes PX.

In other words, the spacers SP are provided in opposition to the gate signal lines GL in such a way that the locations to dispose the respective spacers SP are selected so that the respective spacers SP are partly opposed to the corresponding extended portions of the pixel electrodes PX each of which constitutes one of the electrodes of the capacitance element Cadd.

In this case, it is possible to obtain the advantage of reducing the area of light leak due to the disorder of alignment of the liquid crystal at the periphery of each of the spacers SP.

Figure 6:
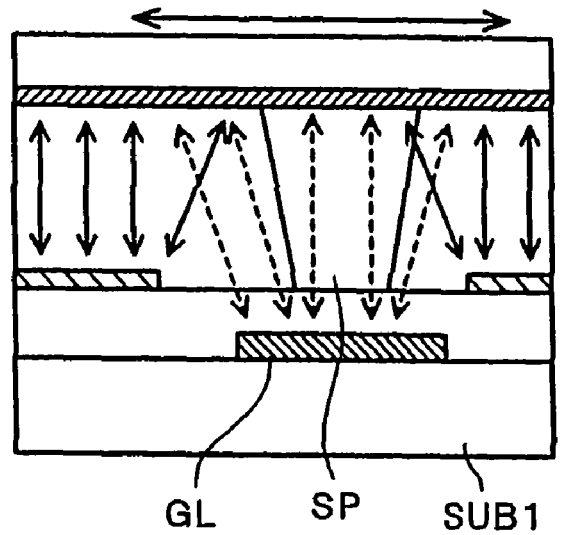
FIG. 6 is a view showing the essential construction of another embodiment of a spacer and the vicinity of the spacer in the liquid crystal display device according to the invention.
Figure 7:
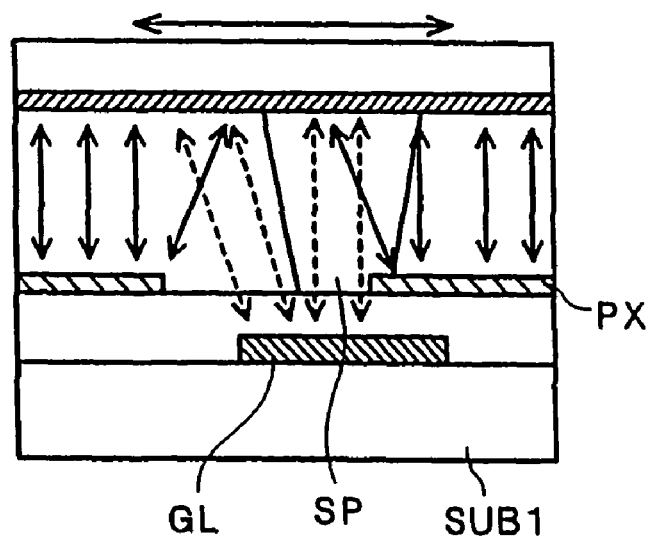
FIG. 7 is a view showing the essential construction of another embodiment of a spacer and the vicinity of the spacer in the liquid crystal display device according to the invention.

FIG. 6 is a view in which a spacer SP is formed in a portion where the extended portion of a pixel electrode PX which constitutes part of a capacitance element Cadd is not formed, and FIG. 7 is a view in which a spacer SP is formed in a portion where the extended portion of a pixel electrode PX which constitutes part of a capacitance element Cadd is formed.

In the construction shown in FIG. 7, the disorder of an electric field does not occur near the extended portion of the pixel electrode PX at the periphery of the spacer SP, whereby the area of light leak is reduced.

Even in the case where the spacers SP are disposed on the transparent substrate SUB1, it is possible to obtain a similar advantage.

Embodiment 4

Figure 9:
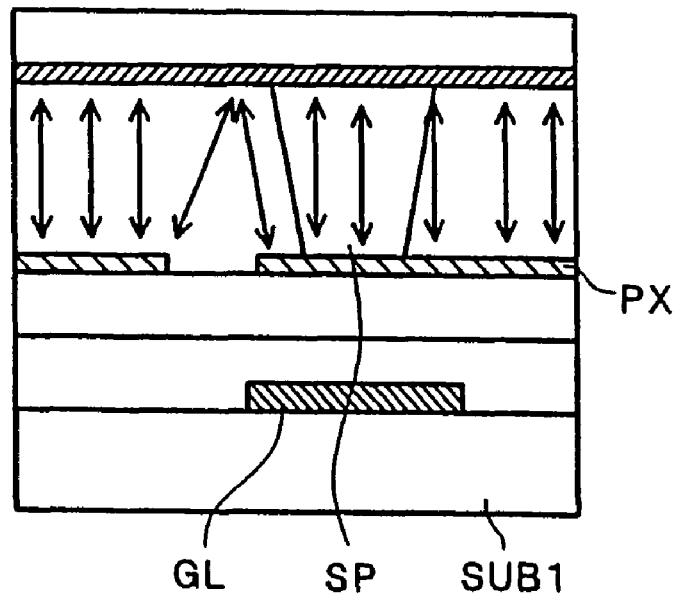
FIG. 9 is a view showing the essential construction of another embodiment of a spacer and the vicinity of the spacer in the liquid crystal display device according to the invention.

Embodiment 4 is a further improvement in Embodiment 3, and as shown in FIG. 9, the spacer SP is constructed to be completely opposed to not only the gate signal line GL and the extended portion of the pixel electrode PX which constitutes one of the electrodes of the capacitance element Cadd.

In other words, the extended portion of the pixel electrode PX is formed to be extended to cover all the abutment area of the vertex surface of the spacer SP.

The reason for this is because the pixel electrode PX is formed on the protective film PSV made of a stacked structure in which an inorganic material layer and an organic material layer are stacked in that order.

Figure 8:
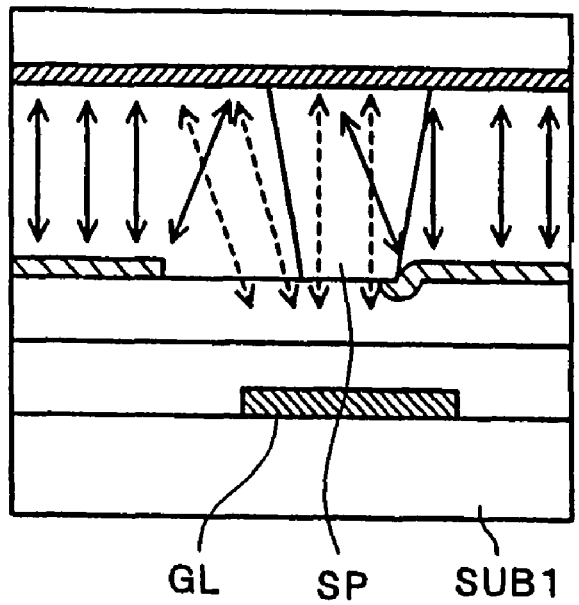
FIG. 8 is a view showing the essential construction of another embodiment of a spacer and the vicinity of the spacer in the liquid crystal display device according to the invention.

In the case where the spacer SP is partly opposed to the extended portion of the pixel electrode PX as described above in Embodiment 3, deformation easily occurs as shown in FIG. 8 in the extended portion of the pixel electrode PX owing to the elasticity of the organic material layer at an edge portion of the vertex surface of the spacer SP, damage due to the deformation will occur.

In this case as well, even if the spacers SP are provided at corresponding locations on the transparent substrate SUB1, it is possible to obtain a similar advantage.

Embodiment 5

Figure 10:
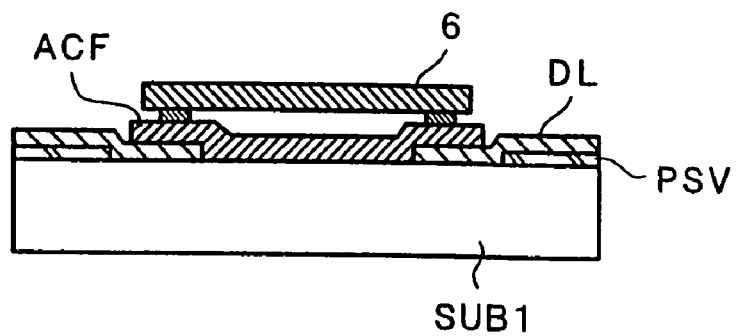
FIG. 10 is a construction view showing one embodiment of the mounting structure of a driver chip in the liquid crystal display device according to the invention.

FIG. 10 is a cross-sectional view showing a portion on which, for example, one of the drain driver ICs 6 is mounted, and is a cross-sectional view taken along line X-X of FIG. 2.

The protective film PSV which is formed in the liquid crystal display area AR is formed to be extended to the surface of the transparent substrate SUB1. The protective film PSV is made of a stacked structure in which the protective film PSV1 which is an inorganic material layer and the protective film PSV2 which is an organic material layer are stacked in that order as described previously.

The drain signal line DL is formed on the upper surface of the protective film PSV, and one end of the drain signal line DL is disposed to be extended to a bump (output bump) of the drain driver IC 6, constituting a terminal part.

Incidentally, in the case of Embodiment 5, the protective film PSV has an aperture formed in a portion which corresponds to the region in which the drain driver IC 6 is mounted as well as the vicinity of this region. Accordingly, the drain signal line DL reaches the portion of the terminal part by being extended from the upper surface of the protective film PSV into the region in which the protective film PSV is not formed.

Incidentally, the drain signal line DL is positioned as a layer underlying the protective film PSV in the liquid crystal display area AR, but it is positioned as a layer which overlies the protective film PSV, by being passed through a through-hole (not shown) formed in the protective film PSV in the vicinity of the drain driver IC 6.

The reason for this is to prevent the occurrence of electrolytic corrosion by forming the drain signal line DL from the through-hole to the terminal part, out of a transparent conductive film of ITO or the like.

The drain driver IC 6 also has a similar construction on its input-bump side, and the interconnection layer connected to the drain circuit board 16B is extended from the upper surface of the protective film PSV into the region in which the protective film PSV is not formed, and reaches terminals connected to the input bumps. An anisotropic conductive film ACF is interposed between the transparent substrate SUB1 and the drain driver IC 6.

This anisotropic conductive film ACF is made of a sheet-shaped resin film which contains conductive particles, and at least by heating the anisotropic conductive film ACF to press the drain driver IC 6, the drain driver IC 6 is fixed to the transparent substrate SUB1 and electrical connection is provided between each of the bumps of the drain driver IC 6 and the corresponding terminal.

This mounting structure of the drain driver IC 6 serves the advantage that after the drain driver IC 6 has been mounted, when the drain driver IC 6 needs to be replaced, reliable repairs can be performed without damaging the periphery of the drain driver IC 6.

Figure 11A:
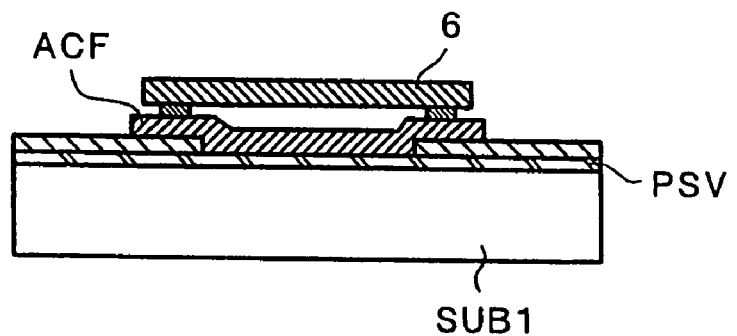
FIGS. 11A and 11B are views showing one example of the mounting structure of a driver chip and the disadvantage of this example.
Figure 11B:
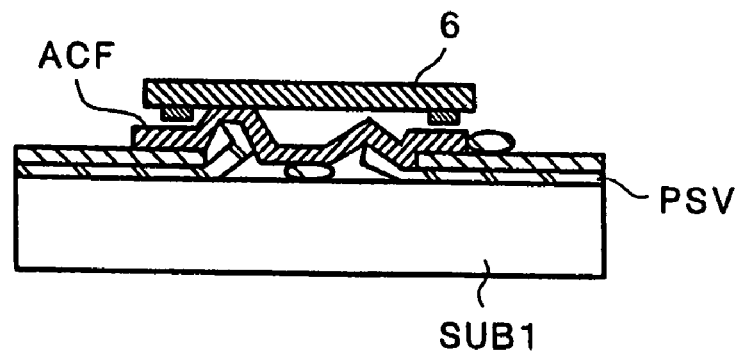

Specifically, in the case where, as shown in FIG. 11A by way of example, the protective film PSV is formed to extend through the region in which the drain driver IC 6 is mounted, there is the problem that when the anisotropic conductive film ACF is melted by a solvent to mount a new anisotropic conductive film ACF and a new drain driver IC 6, the organic material layer formed on the protective film PSV also peels non-uniformly or a residue is left as shown in FIG. 1B.

From this fact, in Embodiment 5, the protective film PSV is made of the stacked structure in which the inorganic material layer and the organic material layer are stacked in that order. However, the invention is not limited to this example, and it goes without saying that a similar advantage can be obtained even with only the organic material layer.

In addition, Embodiment 5 is not limited to the mounting structure of the drain driver IC 6, and can also, of course, be applied to the mounting structures of the gate driver ICs 5. In addition, Embodiment 5 can be similarly applied to embodiments which will be described below.

Embodiment 6

Figure 12:
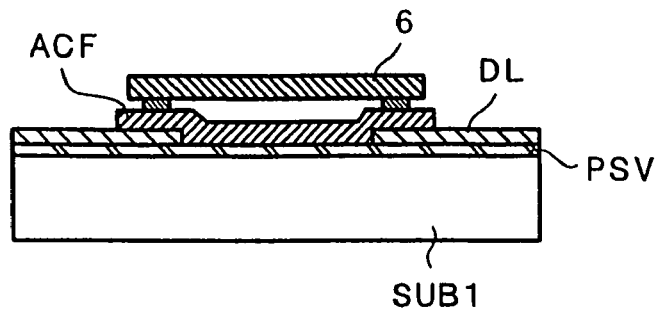
FIG. 12 is a construction view showing another embodiment of the mounting structure of a driver chip in the liquid crystal display device according to the invention.

FIG. 12 is a cross-sectional view showing another embodiment of the mounting structure of the drain driver IC 6.

Unlike Embodiment 5, as shown in FIG. 12, the stacked structure in which the inorganic material layer and the organic material layer are stacked in that order is also formed in the region in which the drain driver IC 6 is mounted, and the layer thickness of the organic material layer is set to 600 nm or more, desirably, 900 nm or more.

The organic material layer having such thickness has an increased film strength and does not easily peel off a base layer, whereby it is possible to improve the rate of renewal for repair.

Embodiment 7

Figure 13:
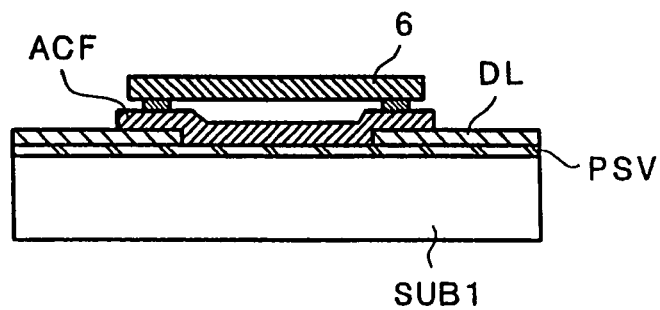
FIG. 13 is a construction view showing another embodiment of the mounting structure of a driver chip in the liquid crystal display device according to the invention.

As compared with Embodiment 6, Embodiment 7 shown in FIG. 13 is constructed so that the layer thickness of the organic material layer is not limited and the protective film PSV made of the stacked structure in which the inorganic material layer and the organic material layer are stacked in that order is formed to extend through the region in which the drain driver IC 6 is mounted.

Since the mounting structure of the drain driver IC 6 is constructed in this manner, the organic material layer serves the function of a shock absorber and can mitigate damage to be caused to the drain driver IC 6 by vibration, shock or pressure applied from the outside.

Embodiment 8

Figure 14:
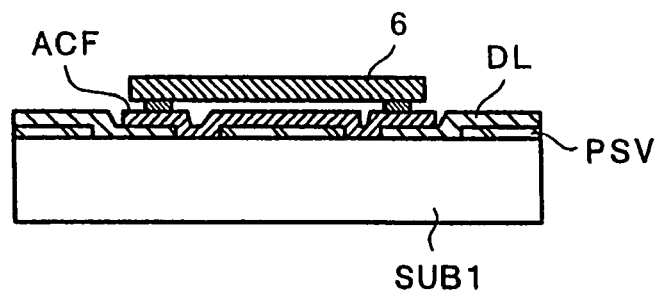
FIG. 14 is a construction view showing another embodiment of the mounting structure of a driver chip in the liquid crystal display device according to the invention.

In Embodiment 8 shown in FIG. 14, the stacked structure in which the inorganic material layer and the organic material layer are stacked in that order is formed to extend through the region in which the drain driver IC 6 is mounted, and apertures are respectively formed in portions which are opposed to the bumps (input and output bumps) of the drain driver IC 6 the vicinity of the bumps.

According to this construction, it is possible to improve the rate of renewal for repair, and it is also possible to mitigate damage to be caused to the drain driver IC 6 by pressure.

Embodiment 9

Figure 15:
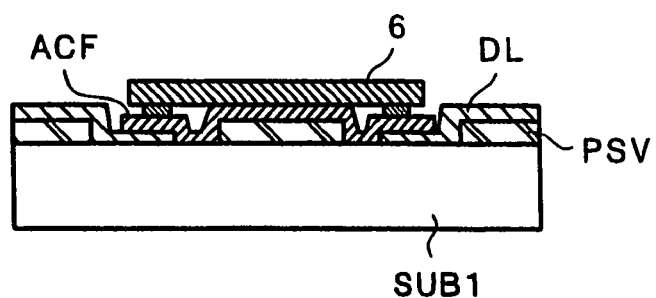
FIG. 15 is a construction view showing another embodiment of the mounting structure of a driver chip in the liquid crystal display device according to the invention.

FIG. 15 is a view showing a further improvement in the above-described Embodiment 8. Embodiment 9 has a construction similar to Embodiment 8 except that the protective film PSV made of the stacked structure in which the inorganic material layer and the organic material layer are stacked in that order has a larger thickness.

Specifically, the thickness of the protective film PSV is set approximately equal to the sum of the height of the bumps of the drain driver IC 6 and the layer thickness of the terminals electrically connected to the bumps.

According to this construction, the protective film PSV and the anisotropic conductive film ACF are interposed in the region between the input bumps and the output bumps of the drain driver IC 6 so as to nearly fill up the space between the drain driver IC 6 and transparent substrate SUB1, whereby it is also possible to mitigate damage to be caused to the drain driver IC 6 by pressure.

Embodiment 10

Figure 16:
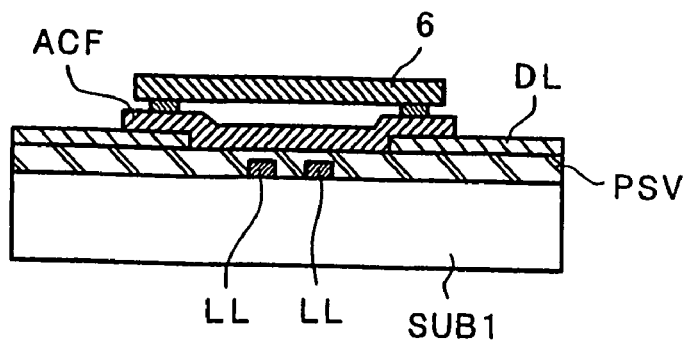
FIG. 16 is a construction view showing another embodiment of the mounting structure of a driver chip in the liquid crystal display device according to the invention.

FIG. 16 is a view which corresponds to FIG. 10 showing Embodiment 5, and shows that interconnection layers LL are formed in a lower portion of the protective film PSV to run in the region between the input bumps and the output bumps of the drain driver IC 6.

In the case of this construction, it is possible to effectively utilize a space near the drain driver IC 6, and it is also possible to reduce an area called a picture frame (the area between the outer outline of the transparent substrate SUB1 and the outer outline of the display area AR).

Incidentally, the interconnection layers LL may be made of one or at least two kinds of lines selected from among a common line, a signal line and a lead line for inspection.

In addition, each of the interconnection layers LL positioned in the lower portion of the protective film PSV can avoid damage by means of the protective film PSV.

The protective film PSV is made of the stacked structure in which the inorganic material layer and the organic material layer are stacked in that order, and even if a crack occurs in the inorganic material layer, this crack is blocked by the organic material layer, whereby it is possible to prevent the interconnection layers LL from being corroded by electrolytic corrosion or the like.

Figure 17:
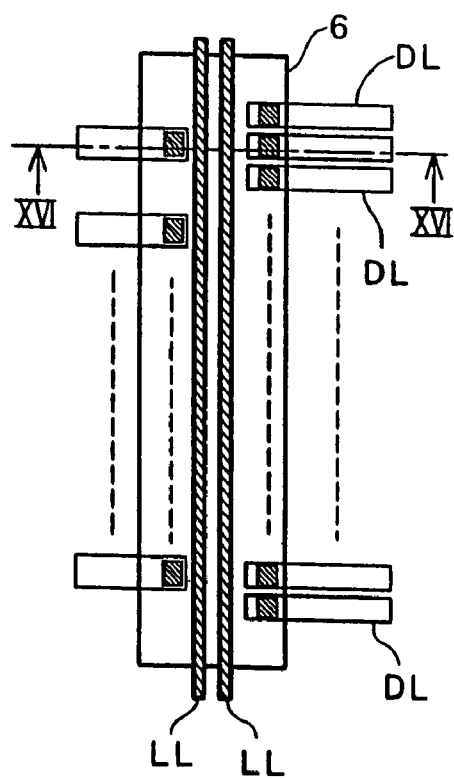
FIG. 17 is a plan view showing another embodiment of the mounting structure of a driver chip in the liquid crystal display device according to the invention, and a cross-sectional view taken along line XVI-XVI of FIG. 17 corresponds to FIG. 16.

Incidentally, the interconnection layers LL are formed to run in the region between the input bumps and the output bumps of the drain driver IC 6 as shown in plan view in FIG. 17, and are in some cases formed to extend to another of the juxtaposed drain driver ICs 6. Incidentally, FIG. 16 is a cross-sectional view taken along line XVI-XVI of FIG. 17 which is a plan view.

Embodiment 11

Figure 18:
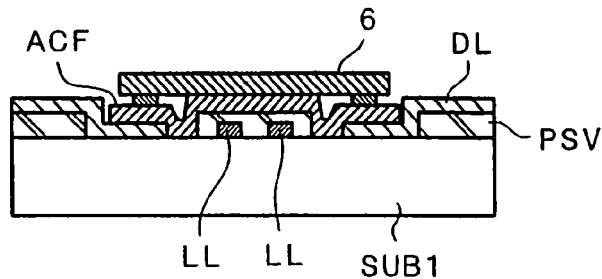
FIG. 18 is a construction view showing another embodiment of the mounting structure of a driver chip in the liquid crystal display device according to the invention.

FIG. 18 is a view corresponding to FIG. 15, and shows that the interconnection layers LL are formed in a lower portion of the protective film PSV to run in the region between the input bumps and the output bumps of the drain driver IC 6.

The thickness of the protective film PSV is set approximately equal to the sum of the height of the bumps of the drain driver IC 6 and the layer thickness of the terminals electrically connected to the bumps. Apertures are respectively formed in the portions of the protective film PSV that are opposed to the bumps (input and output bumps) of the drain driver IC 6 and the vicinity of the bumps.

This construction has the advantages described above in Embodiment 12 and Embodiment 11.

Embodiment 12

Figure 19A:
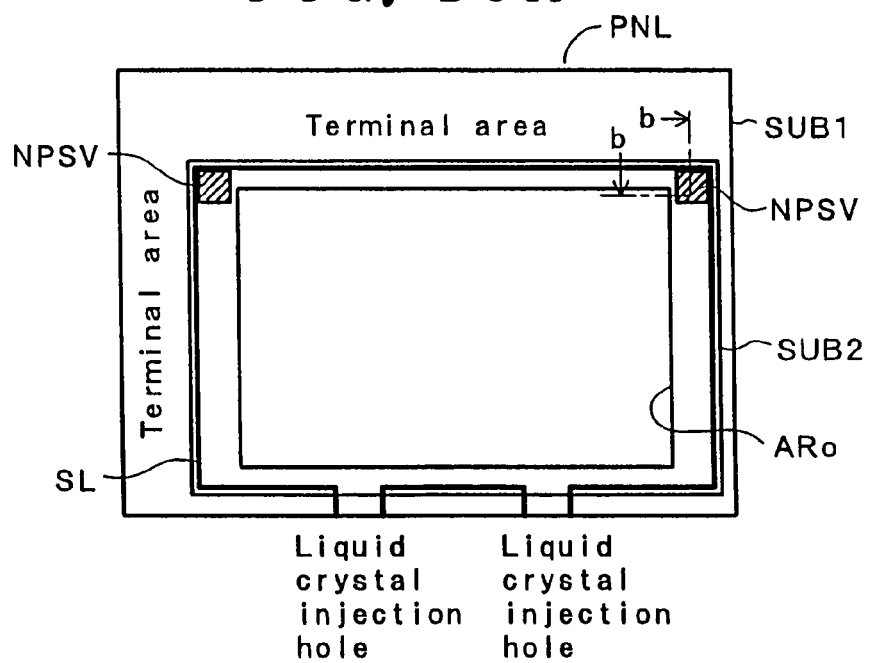
FIGS. 19A and 19B are construction views showing another embodiment of the liquid crystal display device according to the invention.
Figure 19B:
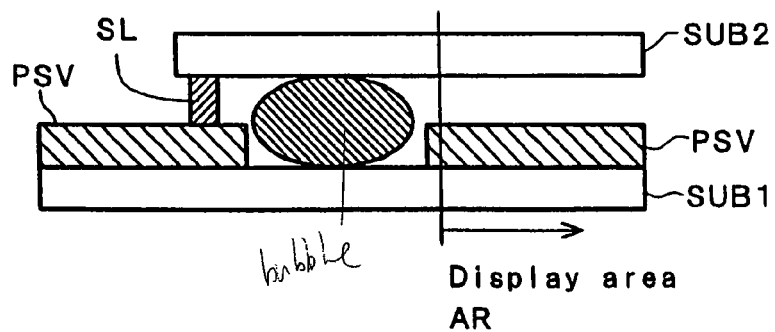

FIG. 19A is a plan view showing a diagrammatic construction of the liquid crystal display panel PNL, and FIG. 19B is a cross-sectional view taken along line b-b of FIG. 19A.

As shown in FIGS. 19A and 19B, the transparent substrate SUB2 is secured to the transparent substrate SUB1 by a sealing material SL, and this sealing material SL also has the function of sealing the liquid crystal.

The sealing material SL is formed along the periphery of the transparent substrate SUB2, and has a rectangular pattern.

Liquid crystal injection holes (in Embodiment 12, two liquid crystal injection holes) for injecting a liquid crystal are formed in one side of the sealing material SL, which one side lies in a portion where an end surface of one of the transparent substrates SUB1 and SUB2 is approximately flush with that of the other. These injection holes are sealed with a sealant (not shown) after the liquid crystal has been sealed.

Non-formation regions NPSV of the protective film PSV2 which is made of an upper organic material layer of the protective film PSV formed on the liquid-crystal-side surface of the transparent substrate SUB1 are respectively provided at corners each of which is formed inside the sealing material SL by the side opposite to the side on which the liquid crystal injection holes are formed and a side intersecting with the opposite side. Incidentally, as the case may be, the first protective film PSV1 made of an inorganic material layer exposed from the non-formation regions NPSV may be removed.

The non-formation regions NPSV of the protective film PSV2 are formed outside an effective display area AR$_O$ formed inside the sealing material SL (the area inside the outer outline of an aggregation of pixel areas, or the area inside the outer outline of an aggregation of the apertures of the black matrix BM).

The reason why the non-formation regions NPSV of the protective film PSV2 are formed outside the effective display area AR$_O$ is that the outside portion of the effective display area AR$_O$ is covered with the black matrix BM and the like, whereby the non-formation regions NPSV can be made invisible from an observer side.

The non-formation regions NPSV of the protective film PSV2 gather bubbles contained in the liquid crystal so that the bubbles are concentrated at each of the non-formation regions NPSV, and do not allow the concentrated bubbles to easily travel from the positions of the non-formation regions NPSV. In other words, the non-formation regions NPSV of the protective film PSV2 has the function of a region for trapping the bubbles.

The process of generation of the bubbles will be described below in detail. First, the process of injecting the liquid crystal into the liquid crystal display panel PNL includes: 1) placing the liquid crystal display panel PNL and a plate full of the liquid crystal into a vacuum vessel; 2) reducing the pressure of the vacuum vessel to reduce the inner pressure of the liquid crystal display panel PNL; 3) bringing the liquid crystal injection holes of the liquid crystal display panel PNL into contact with the liquid crystal of the plate; and 4) introducing air or inert gas into the vacuum vessel.

Since a difference in pressure occurs between the inside and the outside of the liquid crystal display panel PNL, the liquid crystal is gradually injected into the liquid crystal display panel PNL through the liquid crystal injection holes until the liquid crystal is charged into the whole of the liquid crystal display panel PNL up to a side remote from the liquid crystal injection holes.

Figure 20A:
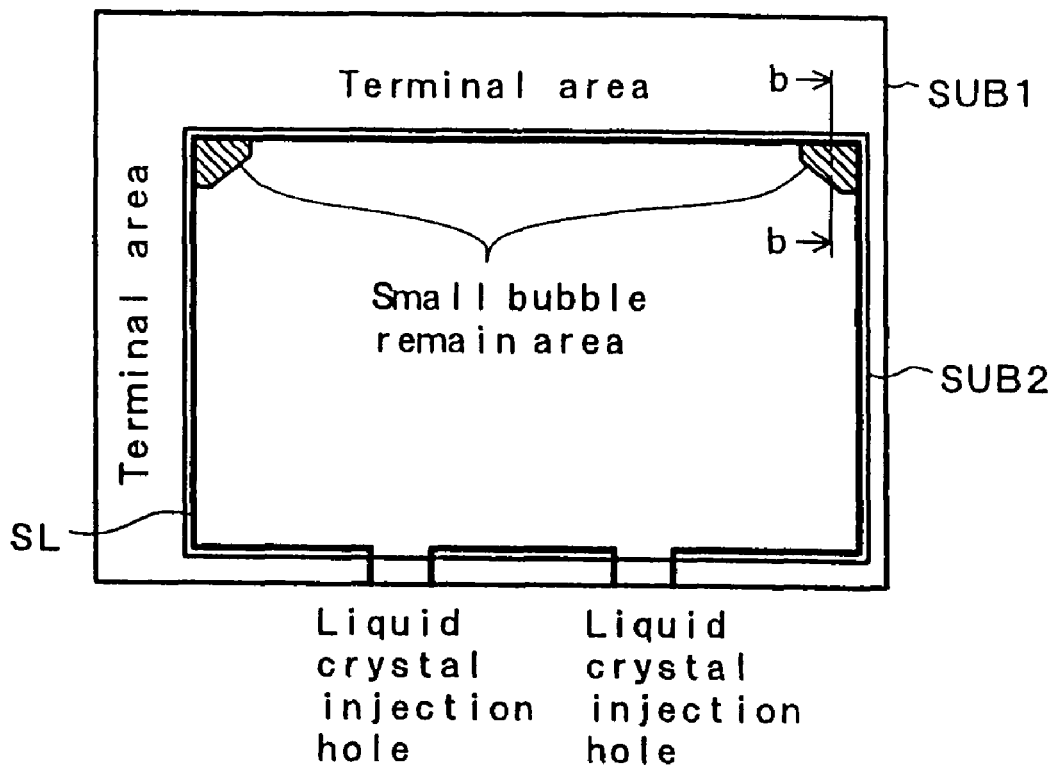
FIGS. 20A and 20B are explanatory views showing the reason why the construction shown in FIGS. 19A and 19B is adopted.
Figure 20B:
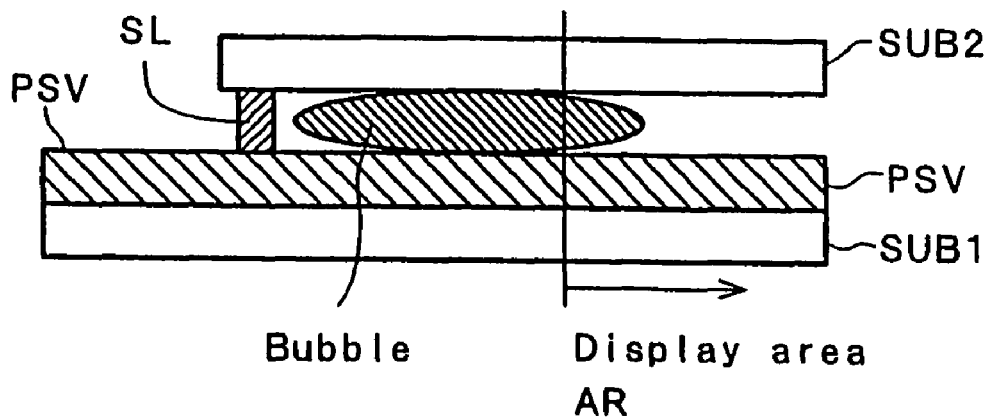

During this liquid crystal injection process, the liquid crystal rises and the pressure of a gas remaining or generated in the liquid crystal display panel PNL also rises, so that the gas remains as bubbles as shown in FIG. 20A by way of example. As shown in FIG. 20B which is a cross-sectional view taken along line b-b of FIG. 20A, the bubbles become large in volume and project into a portion of the effective display area $AR_0$, so that these projecting portions become visible.

In the case where the protective film PSV is formed of a stacked structure in which an inorganic material layer and an organic material layer are stacked in that order, a large number of bubbles tend to be generated due to the presence of the organic material layer. For this reason, the above-described construction is extremely effective.

Figure 21:
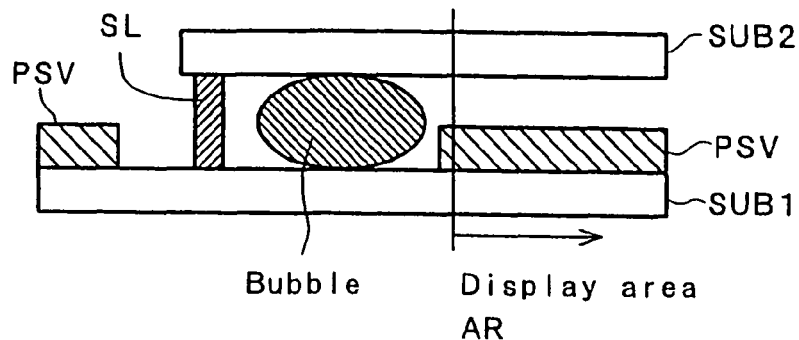
FIG. 21 is a construction view showing another embodiment of the liquid crystal display device according to the invention.

Incidentally, in the case of Embodiment 12, the non-formation region NPSV of the organic material layer of the protective film PSV may also be formed along the entire periphery of the sealing material SL. In this case, as shown in FIG. 21, the non-formation region NPSV may be formed in the region in which the sealing material SL is formed, and at the outside of the sealing material SL.

This construction serves the advantage of strengthening the adhesion of the sealing material SL to the liquid-crystal-side surface of the transparent substrate SUB1.

Embodiment 13

In the above-described Embodiment 12, the bubble trapping regions are formed on the transparent substrate SUB1, but even if they are provided on the transparent substrate SUB2, it is possible to obtain a similar advantage.

The black matrix BM, the color filters FIL, the leveling film OC and the like are formed on the liquid-crystal-side surface of the transparent substrate SUB2, and non-formation regions may be formed in at least one of the black matrix BM, the color filters FIL, the leveling film OC and the like at positions opposed to the non-formation regions NPSV shown in FIG. 19A.

Embodiment 14

The construction described above in Embodiment 12 or Embodiment 13 becomes particularly effective when it is applied to the construction shown in FIG. 1.

Specifically, the construction shown in FIG. 1 is such that the counter electrode CT is formed on the upper surface of the protective film PSV which is formed of a stacked structure in which an inorganic material layer and an organic material layer are stacked in that order, and the counter electrode CT becomes a barrier which can restrain gas to be emitted from the organic material layer toward the liquid crystal.

In other words, Embodiment 14 has a construction which reliably traps a comparatively small number of bubbles generated in the liquid crystal due to the gas emitted from the organic material layer exposed in an area other than the area in which the counter electrode CT is formed.

The counter electrode CT is made of plural stripe-shaped electrodes, and there exist a large number of undulations due to steps formed on a surface by these electrodes. For this reason, during the liquid crystal injection process, the gas emitted from the organic material layer is dispersed in the effective display area as small bubbles having a size of a maximum of approximately several μm, whereby the generation of large bubbles can be restrained.

According to an experiment, in the case of Embodiment 14, it was possible to achieve restraint of generation of bubbles to such an extent that observation was not hindered, when the number of electrodes of the counter electrode CT was made 5 or more per pixel area or the distance between each of the electrodes CT was made 13 μm or less.

Incidentally, in Embodiment 14, the counter electrode CT is formed on the upper surface of the protective film PSV made of the stacked structure in which the inorganic material layer and the organic material layer are stacked in that order, but the pixel electrode PX may be formed instead of the counter electrode CT. In addition, both the pixel electrode PX and the counter electrode CT may be formed.

Incidentally, in the case of the construction which enables the generation of bubbles to be fully restrained by such an electrode, it goes without saying that it is not necessary to provide the non-formation regions of the organic material layer described above in Embodiment 12 or 13.

Embodiment 15

In the case of Embodiment 12 and the like, the extending direction of each of the pixel electrode PX and the counter electrode CT is made perpendicular to the side of the sealing material SL on which the liquid crystal injection holes are formed.

However, it has been confirmed that in the case where the extending direction of each of the pixel electrode PX and the counter electrode CT is made approximately parallel to the side of the sealing material SL on which the liquid crystal injection holes are formed, it is possible to achieve a further reduction in the number of bubbles.

Embodiment 16

Figure 43:
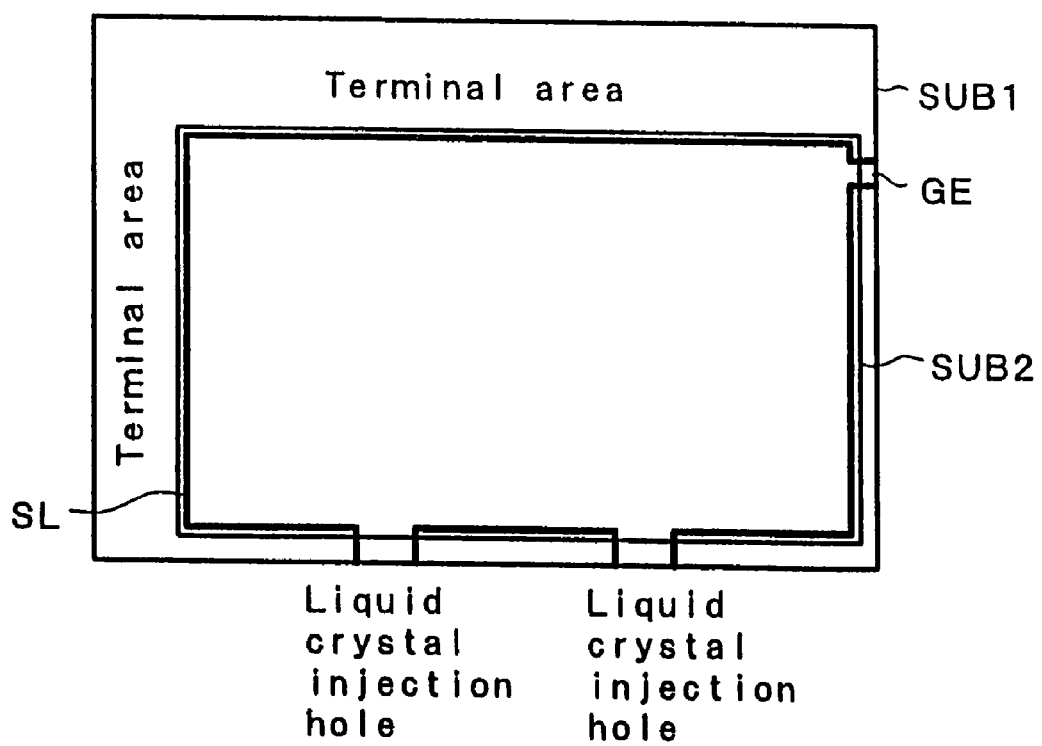
FIG. 43 is a plan view showing another embodiment of the liquid crystal display device according to the invention, with a frame being shown together with the construction.

FIG. 43 is a plan view showing another embodiment which is effective in removing bubbles contained in the liquid crystal.

As shown in FIG. 43, a bubble exhaust hole GE is formed in the sealing material SL in addition to the liquid crystal injection holes.

During the injection of a liquid crystal, the bubbles contained in the liquid crystal can be exhausted through the bubble exhaust hole GE.

As shown in FIG. 20A, the region in which bubbles are generated is a corner which is formed by the side opposite to the side of the sealing material on which the liquid crystal injection holes are formed and a side intersecting with the opposite side. Accordingly, it is effective to provide the bubble exhaust hole GE in the vicinity of the corner.

Embodiment 17

Figure 22A:
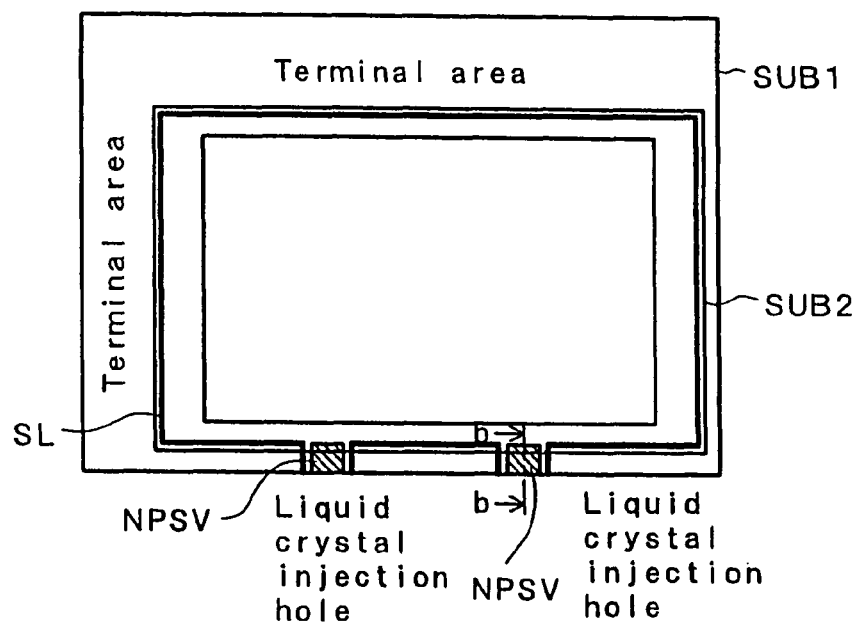
FIGS. 22A and 22B are construction views showing another embodiment of the liquid crystal display device according to the invention.
Figure 22B:
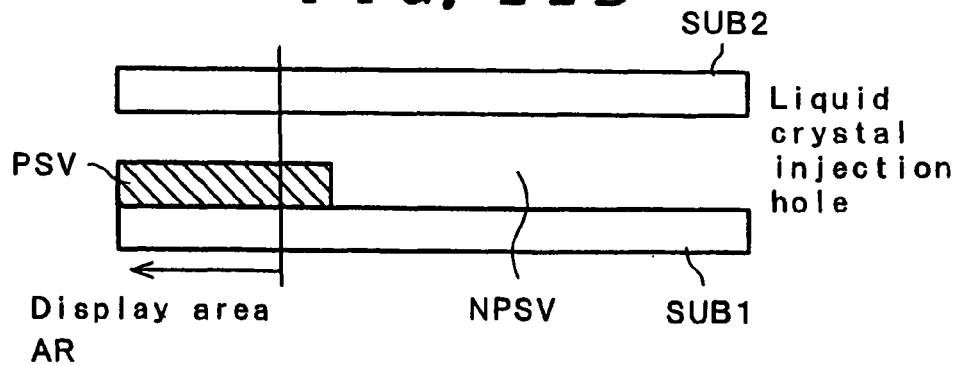

In Embodiment 17, as shown in FIG. 22A, the respective non-formation regions NPSV of the organic material layer are provided in the liquid crystal injection holes (liquid crystal introducing portions) formed in a part of the sealing material SL.

According to this construction, the diameter (cross-sectional area) of each of the liquid crystal injection holes becomes large as shown in a cross-sectional view taken along line b-b of FIG. 22A. Accordingly, the speed of injection of a liquid crystal increases, whereby an improvement in throughput can be achieved.

Embodiment 18

Figure 23:
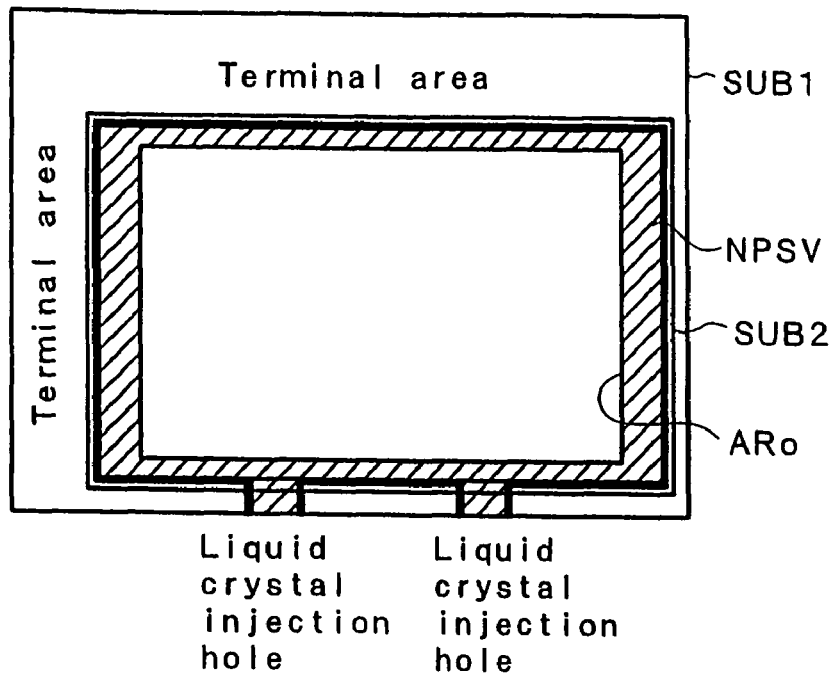
FIG. 23 is a construction view showing another embodiment of the liquid crystal display device according to the invention.

Embodiment 18 shown in FIG. 23 is a further improvement in Embodiment 17, and a non-formation region NPSV of the organic material layer is provided not only in the liquid crystal injection holes, but is formed to extend along the periphery of the sealing material SL on the inside thereof.

Embodiment 19

Figure 24:
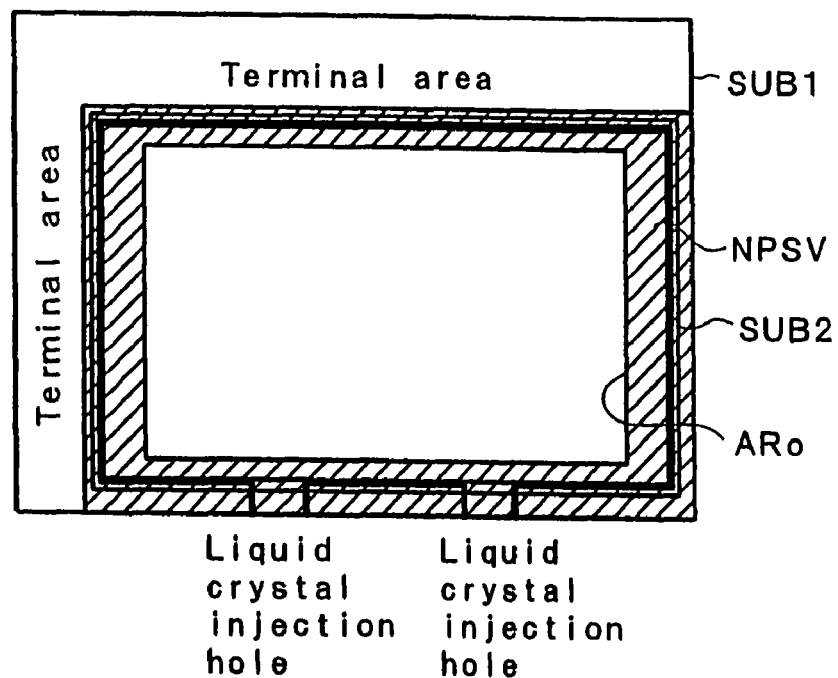
FIG. 24 is a construction view showing another embodiment of the liquid crystal display device according to the invention.

Embodiment 19 shown in FIG. 24 is a further improvement in Embodiment 18, and a non-formation region NPSV of the organic material layer is provided in such a manner as to extend along the periphery of the sealing material SL and contain the region in which the sealing material SL is formed.

According to this construction, the speed of injection of a liquid crystal increases, and it is possible to improve the strength of adhesion of the sealing material SL to the transparent substrate SUB1.

Embodiment 20

Figure 25:
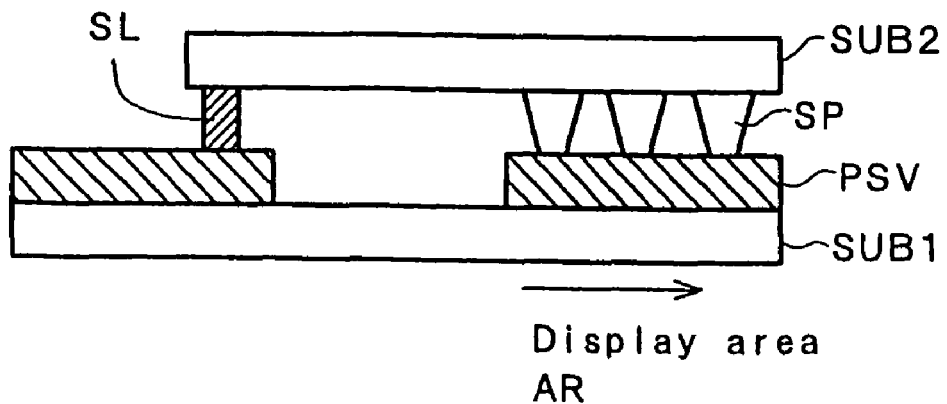
FIG. 25 is a construction view showing another embodiment of the liquid crystal display device according to the invention.

In Embodiment 20, as shown in FIG. 25, in the case where a non-formation region NPSV is formed in the protective film PSV in order to solve the problem due to bubbles in the liquid crystal as described above, spacers SP are provided on one of the transparent substrate SUB1 and the transparent substrate SUB2 as spacers for ensuring the gap between the transparent substrates SUB1 and SUB2.

Figure 26:
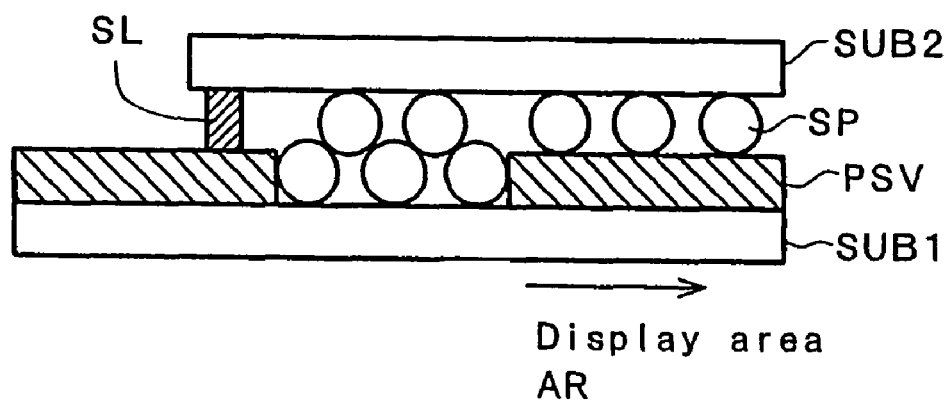
FIG. 26 is an explanatory view showing the reason why the construction shown in FIG. 25 is adopted.

For example, if beads are used as such spacers, the beads are liable to gather in the non-formation region NPSV as shown in FIG. 26, because the motions of the beads are not restricted. This fact leads to the problem of a decrease in the number of spacers required to ensure the gap between the transparent substrate SUB1 and the transparent substrate SUB2. Furthermore, in this case, the non-formation region NPSV of the protective film PSV decreases in effective volume, so that the effect of solving the problem due to bubbles is decreased.

Figure 27:
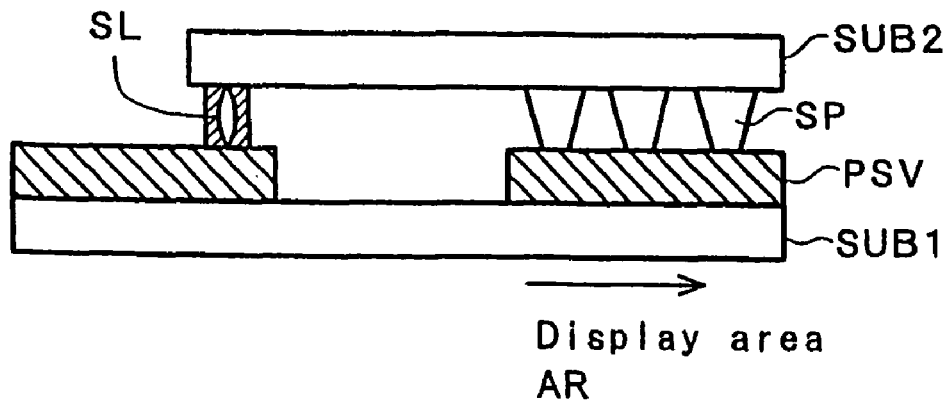
FIG. 27 is a construction view showing another embodiment of the liquid crystal display device according to the invention.

FIG. 27 shows another example in which spacers made of, for example, beads or fibers are contained in the sealing material SL in the construction shown in FIG. 25.

Figure 28:
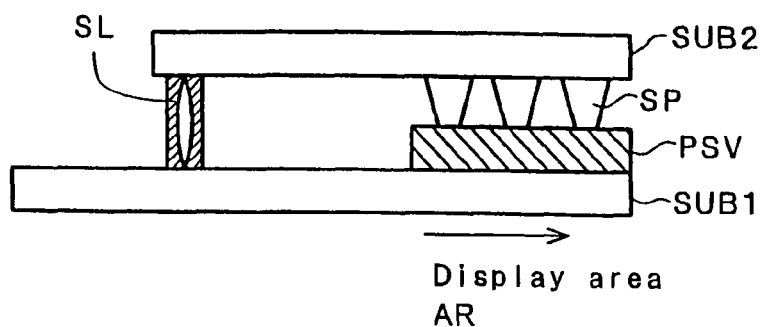
FIG. 28 is a construction view showing another embodiment of the liquid crystal display device according to the invention.

FIG. 28 shows another example in which in the case where the non-formation region NPSV of the protective film PSV is extended into the region in which the sealing material SL is formed, spacers which are made of, for example, beads or fibers and have a diameter larger than the height of the spacers SP are contained in the sealing material SL.

Embodiment 21

Figure 29:
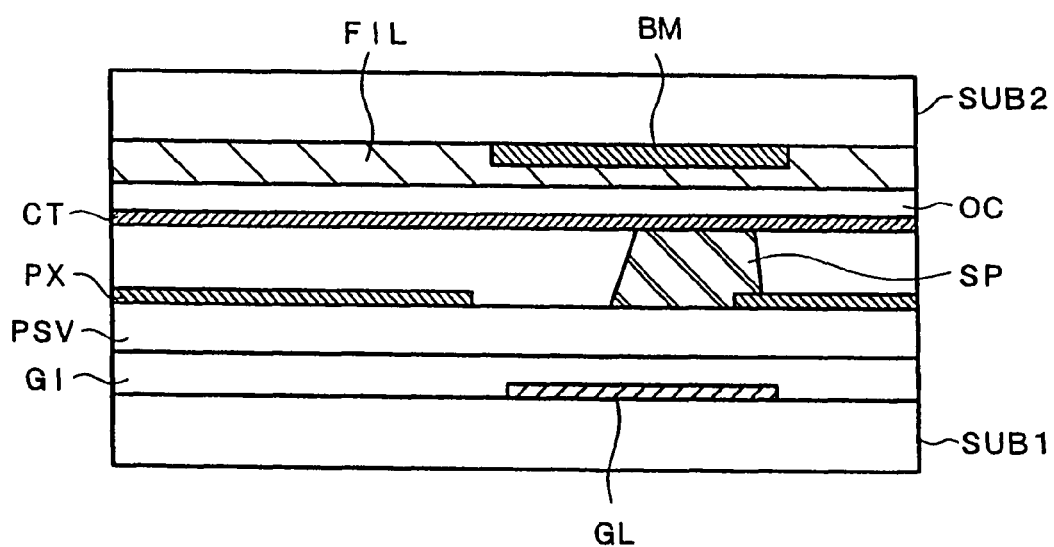
FIG. 29 is a construction view showing another embodiment of the liquid crystal display device according to the invention.

FIG. 29 is a cross-sectional view showing a spacer formed on the transparent substrate SUB1 as well as the vicinity of the spacer. This portion corresponds to the portion shown in the cross-sectional view taken along, for example, line d-d of FIG. 5A (or line c-c of FIG. 1A).

The spacer SP shown in FIG. 25 is formed on the transparent substrate SUB1 in this embodiment. According to this construction, the area of the spacer SP taken in a plane intersecting with its central axis is made larger on the transparent substrate SUB1 than on the transparent substrate SUB2.

According to this construction, even if vibration or shock occurs in the liquid crystal display panel PNL, the liquid crystal display panel PNL itself can function as a shock absorbing layer and restrain the vibration or shock from being transmitted to a signal line positioned under the spacer SP on the transparent substrate SUB1, whereby it is possible to avoid troubles such as disconnection of the signal line.

Embodiment 22

In the case of the construction shown in FIG. 29, since the protective film PSV formed on the transparent substrate SUB1 is formed as a stacked structure in which an inorganic material layer and an organic material layer are stacked in that order, the organic material layer also functions as a shock absorbing layer, whereby it is possible to reliably prevent troubles such as disconnection of the signal line (in this case, a gate signal line GL) positioned under the protective film PSV.

Embodiment 23

Embodiment 23 has a construction in which in the protective film PSV made of the stacked structure in which the inorganic material layer and the organic material layer are stacked in that order, the layer thickness of the organic material layer is made larger than that of the inorganic material layer.

According to this construction, the function of the organic material layer to serve as the shock absorbing layer can be improved to a further extent.

Embodiment 24

Embodiment 24 relates to the alignment marks required to position the gate driver ICs 5 or the drain driver ICs 6 during mounting of the gate driver ICs 5 or the drain driver ICs 6.

Figure 30A:
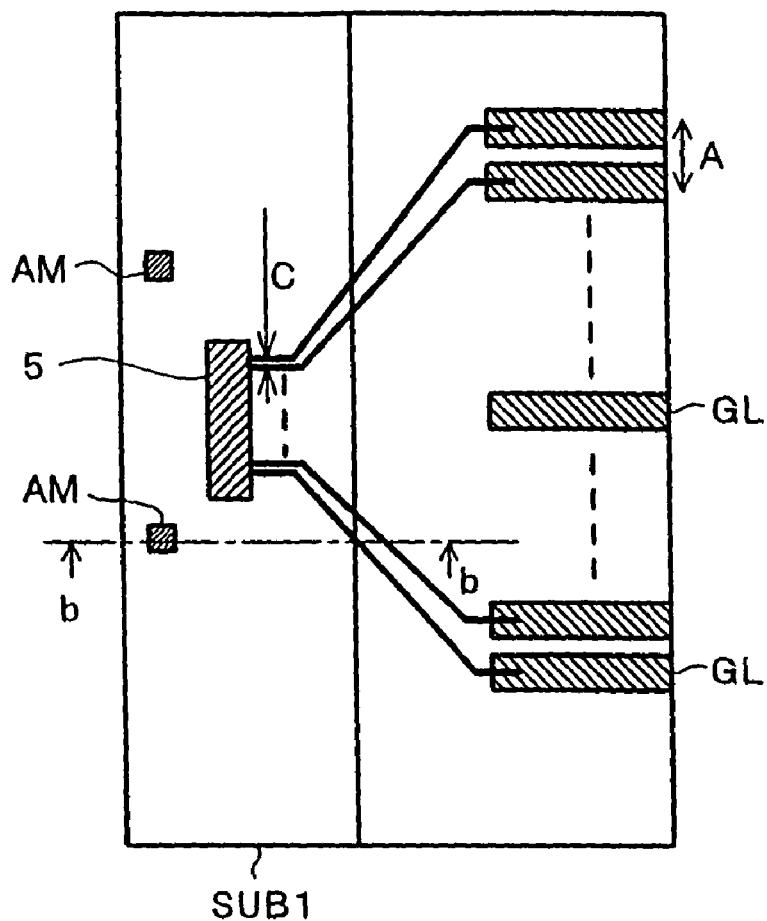
FIGS. 30A and 30B are construction views showing one embodiment of an alignment mark formed in the vicinity of a driver chip mounted in the liquid crystal display device according to the invention.

As shown in FIG. 30A, such alignment marks are formed on the transparent substrate SUB1 in the vicinity of a region in which, for example, a gate driver IC 5 is mounted. These alignment marks AM are prepared by forming a predetermined pattern of layer made of a metal material at the same time that, for example, the gate signal lines GL are formed on the surface of the transparent substrate SUB1, and, in the case of a construction having pixels of the type shown in FIGS. 1A to 1C or 5A to 1C by way of example, stacking a layer made of an inorganic material layer and a layer made of an organic material layer on the upper surface of the predetermined pattern in that order.

Figure 31A:
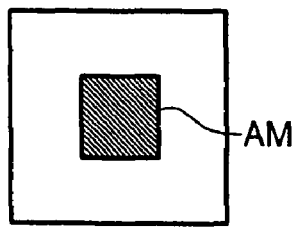
FIGS. 31A to 31C are views showing different patterns of the alignment mark.
Figure 31B:
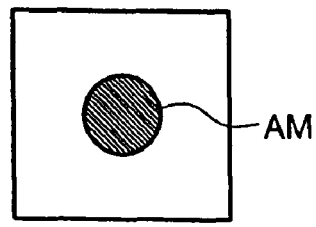
Figure 31C:
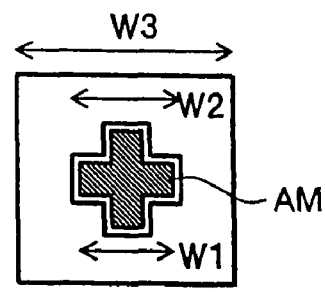

The layer made of the predetermined pattern of metal material layer has a shape such as any of those shown in FIGS. 31A to 31C by way of example.

Figure 30B:
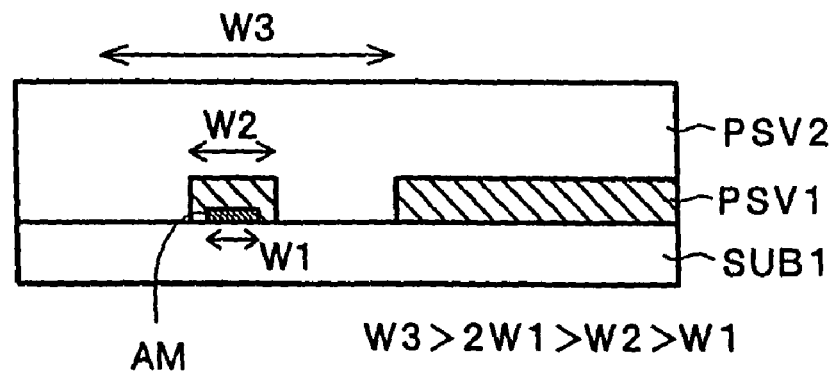

As shown in FIG. 30B which is a cross-sectional view taken along line b-b of FIG. 30A, the layer made of the inorganic material layer has a pattern similar to the layer made of the metal material layer, and is formed to be wider than the layer of the metal material layer with their central axes being approximately coincident with each other. An enough space is formed between the layer made of the inorganic material layer and an inorganic material layer which surrounds the periphery of the layer.

Specifically, the pattern shown in FIG. 31C by way of example is formed to satisfy the following expression (2):

$$W3 > 2W1 > W2 > W1 \tag{2}$$

where W1 represents the width of the layer made of the metal material layer; W2 represents the width of the layer made of the inorganic material layer; and W3 represents the width of the area surrounded by the surrounding inorganic material layer.

An organic material layer extended from the pixel areas is formed on the upper surface of, and at the periphery of, the layer made of the inorganic material layer.

In the case where the alignment mark AM formed in this manner is imaged (in reflection mode) by means of, for example, a camera connected to an image apparatus, the layer made of the metal material layer is recognized via the inorganic material layer and the organic material layer.

In this case, since the layer made of the inorganic material layer is constructed in a pattern approximately the same as the layer made of the metal material layer, the layer made of the inorganic material layer can also be made to function as an alignment mark.

For example, in the case where the layer made of the metal material layer is used as the alignment mark AM and the inorganic material layer and the organic material layer are formed to be stacked in that order on the upper surface of the layer, a recognized image is displayed as a distorted image and is wholly blurred to such an extent that it cannot be accurately recognized, as the result of not only reflection from the surface of the metal material layer but also reflection from the surface of the transparent substrate SUB1, reflection from the surface of the inorganic material layer and reflection from the surface of the organic material layer.

In particular, the peak waveform of reflection from the surface of the inorganic material layer and that of reflection from the surface of the organic material layer differ from each other and each of their reflection wavelength ranges is a wide range equivalent to the range of visible rays, so that the strength of reflection from the area other than the area of the alignment mark becomes nearly two-fold over an apparently wide range and the accurate recognition of the alignment mark is hindered.

Embodiment 25

The above-described Embodiment 24 is constructed so that the relationship of the expression (2) can be satisfied, letting W1 be the width of the layer made of the metal material layer; W2 be the width of the layer made of the inorganic material layer; and W3 be the width of the area surrounded by the surrounding inorganic material layer. However, the relationship between W1, W2 and W3 may also be set so that, for example, the relationship of the following expression (3) can be satisfied:

$$W2<2W1, \text{ and } W3>3W1 \quad (3)$$

In this case as well, it is possible to correctly recognize the alignment mark.

Embodiment 26

Figure 32:
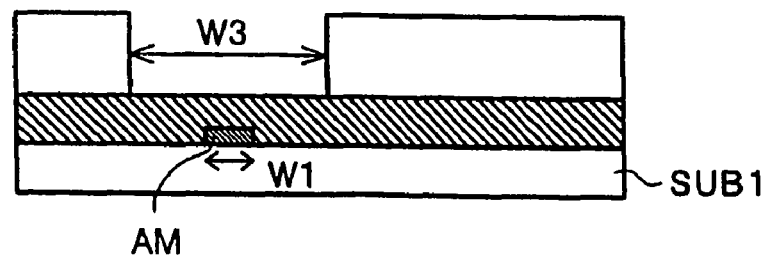
FIG. 32 is a construction view showing another embodiment of the alignment mark formed in the vicinity of a driver chip mounted in the liquid crystal display device according to the invention.

FIG. 32 is a cross-sectional view showing another embodiment of the construction of the vicinity of the alignment mark AM. As is apparent from FIG. 32, an inorganic material layer and an organic material layer are stacked in that order to cover the alignment mark AM made of a metal material layer, and an aperture is formed in the organic material layer in a portion which includes the region in which the alignment mark AM is formed and the surrounding portion of the region.

According to this construction, reflection from the surface of the organic material layer is removed, and the alignment mark AM can be clearly recognized.

In this case, it has been confirmed that letting W1 be the width of the layer made of the metal material layer and W3 be the width of the aperture of the organic material layer, it is possible to image the alignment mark AM without distortion by setting the relationship between W1 and W3 so that the relationship of W3>3W1 is satisfied.

Embodiment 27

Figure 33:
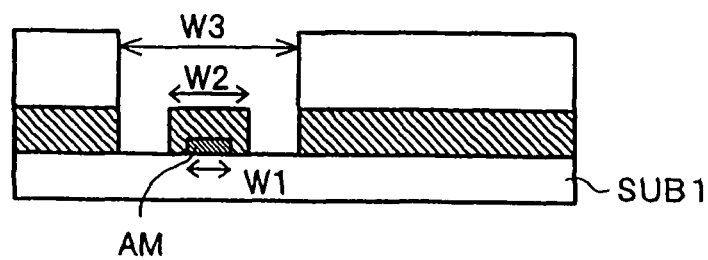
FIG. 33 is a construction view showing another embodiment of the alignment mark formed in the vicinity of a driver chip mounted in the liquid crystal display device according to the invention.

FIG. 33 is a cross-sectional view showing another embodiment of the construction of the vicinity of the alignment mark AM. Embodiment 27 shown in FIG. 33 is a further improvement in the construction of FIG. 31, and an aperture is opened in not only the inorganic material layer but also the organic material layer so that the reflection from the surface of the organic material layer can be eliminated.

In this case, the width of the aperture of the organic material layer is W3.

Embodiment 28

Figure 34:
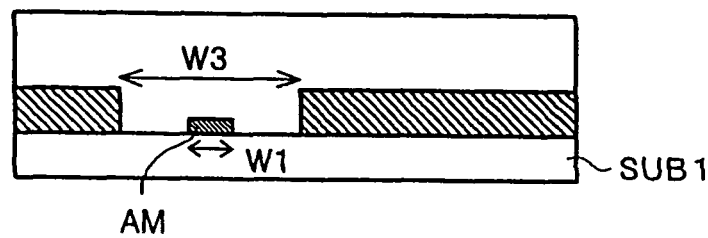
FIG. 34 is a construction view showing another embodiment of the alignment mark formed in the vicinity of a driver chip mounted in the liquid crystal display device according to the invention.

FIG. 34 is a cross-sectional view showing another embodiment of the construction of the vicinity of the alignment mark AM.

In Embodiment 28 shown in FIG. 34, in the case where the inorganic material layer and the organic material layer are stacked in that order to cover the alignment mark made of the metal material layer, an aperture is provided in the inorganic material layer in a portion which includes the region in which the alignment mark is formed and the surrounding portion of the region.

In this case, letting W1 be the width of the alignment mark AM and W3 be the width of the aperture of the inorganic material layer, the relationship between W1 and W3 is set so that the relationship of W3>3W1 is satisfied.

Embodiment 29

Figure 35:
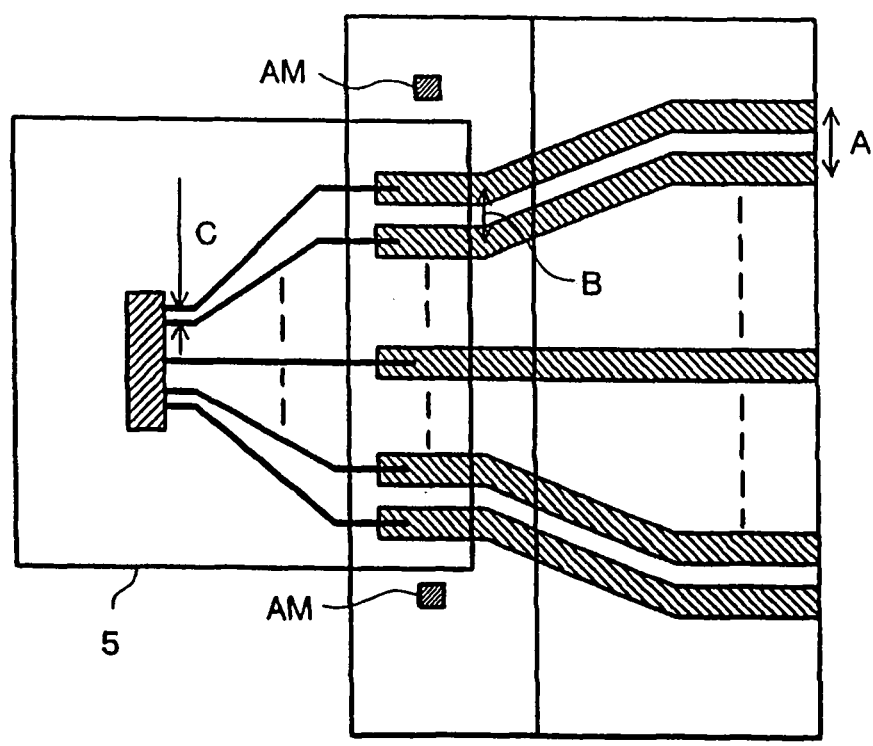
FIG. 35 is a construction view showing another embodiment of the alignment mark formed in the vicinity of a driver chip mounted in the liquid crystal display device according to the invention.

FIG. 35 is a view showing a gate driver IC 5 formed by a so-called tape carrier method.

Embodiment 29 has a construction in which a semiconductor integrated circuit is mounted on a film-like substrate and the bumps of the semiconductor integrated circuit are respectively led to a peripheral side of the substrate via interconnection layers formed on the substrate.

In this case as well, alignment marks AM are needed to connect the transparent substrate SUB1 and the gate driver IC 5, and the construction of each of the alignment marks AM is similar to that used in any of the above-described embodiments.

Embodiment 30

Figure 36A:
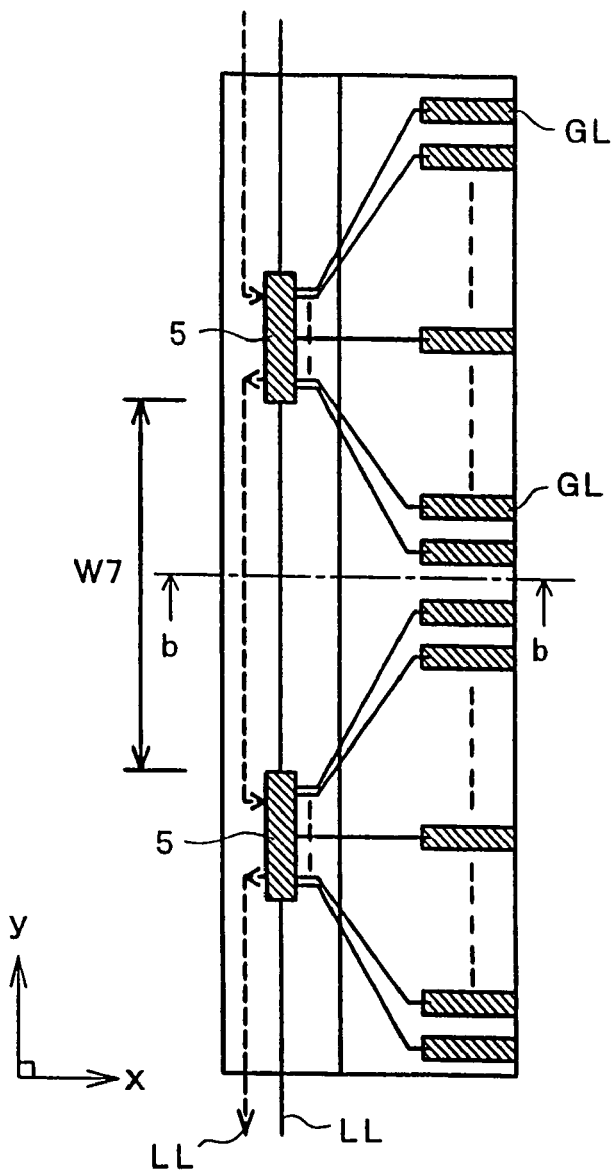
FIGS. 36A and 36B are construction views showing another embodiment of the alignment mark formed in the vicinity of a driver chip mounted in the liquid crystal display device according to the invention.
Figure 36B:
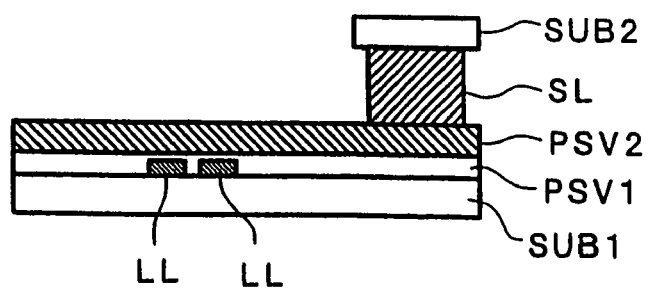

FIG. 36A is a plan view partly showing the area in which, for example, the gate driver ICs 5 are mounted, and is a construction view of the portion surrounded by a dashed-line frame A in FIG. 2. FIG. 36B is a cross-sectional view taken along line b-b of FIG. 36A.

As shown in FIG. 36A, the gate signal lines GL are formed to be extended in the x direction and juxtaposed in the y direction. Each of these gate signal lines GL is extended from the liquid crystal display area AR beyond the sealing material SL.

The gate signal lines GL are divided into groups each including mutually adjacent gate signal lines GL, and the gate signal lines GL of each of the groups are extended while converging toward one another. Formed at the extended ends of the respective gate signal lines GL are terminals which are respectively connected to the output bumps of the corresponding one of the gate driver ICs 5 each made of a semiconductor chip.

The reason why the gate signal lines GL of each of the groups are formed in a pattern converged in the vicinity of the corresponding one of the gate driver ICs 5 is that the pitch of the bumps of each of the gate driver ICs 5 is smaller than the line pitch of the gate signal lines GL in the liquid crystal display area AR.

The gate signal lines GL, as described previously, are directly formed on the surface of the transparent substrate SUB1 in the liquid crystal display area AR (that is to say, in a layer underlying the protective film PSV and the insulating film GI). However, in the vicinity of the gate driver ICs 5, the gate signal lines GL are formed on the upper surface of the protective film PSV by being passed through through-holes formed in the protective film PSV.

Accordingly, the area in which the gate driver ICs 5 are mounted is the area in which the protective film PSV is formed.

The protective film PSV, as described above, is made of the stacked structure in which the inorganic material layer and the organic material layer are stacked in that order, and the organic material layer serves as a shock absorber to protect the gate driver ICs 5 mounted on the protective film PSV against vibration and shock.

In Embodiment 30, interconnection layers LL are formed to run directly below each of the gate driver ICs 5. The interconnection layers LL are formed at the same time that the gate signal lines GL (or the drain signal lines DL) are formed.

In other words, the interconnection layers LL are formed in a layer underlying the protective film PSV, and are protected from direct exposure to the air by the protective film PSV.

The interconnection layers LL are used as power source lines, lines for inspection or other signal lines, and are constructed in such a manner that, for example, power source lines or another signal lines which would have heretofore been formed on a printed circuit board disposed in the vicinity of the transparent substrate SUB1 are disposed on the transparent substrate SUB1.

According to this construction, it is possible to effectively use a so-called dead space of the transparent substrate SUB1.

As shown in FIG. 36A. since the region in which each of the gate driver ICs 5 is mounted is comparatively small, the distance W7 between each of the gate driver ICs 5 is comparatively large. In this case, if the interconnection layers LL are formed on the protective film PSV, the interconnection layers LL will be exposed to the air over nearly their whole length, and the probability that disconnection or the like due to electrolytic corrosion or the like occurs will greatly increase.

However, in the case of Embodiment 30, since the interconnection layers LL are formed in the layer underlying the protective film PSV, such a disadvantage can be solved, and damage due to vibration or shock from the outside can be prevented by the organic material layer of the protective film PSV.

In the description of Embodiment 30, reference has been made to the construction of the area in which the gate driver ICs 5 are mounted as well as the construction of the vicinity of the area. However, it goes without saying that the invention can also be applied to the area in which the drain driver ICs 6 are mounted as well as the vicinity of the area. A similar explanation applies to embodiments which will be described below.

Embodiment 31

In Embodiment 30, the protective film PSV which covers the interconnection layers LL is formed of the stacked structure in which the inorganic material layer and the organic material layer are stacked in that order.

However, the protective film PSV may also be made of only an organic material layer (even in the liquid crystal display area AR), and it goes without saying that the protective film PSV may be formed of only an organic material layer in a portion which covers the interconnection layers LL as well as in the vicinity of the portion.

However, in the case where the protective film PSV is made of the stacked structure in which the inorganic material layer and the organic material layer are stacked in that order, even if a crack occurs in the inorganic material layer, this crack is blocked by the organic material layer and the interconnection layers LL are firmly protected against electrolytic corrosion.

Embodiment 32

Figure 37A:
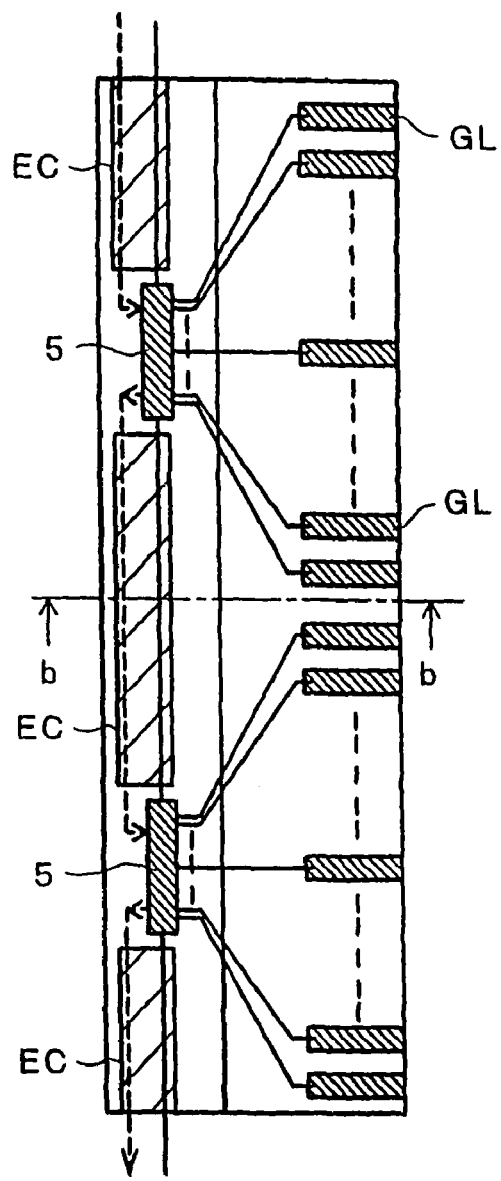
FIGS. 37A and 37B are construction views showing another embodiment of the alignment mark formed in the vicinity of a driver chip mounted in the liquid crystal display device according to the invention.
Figure 37B:
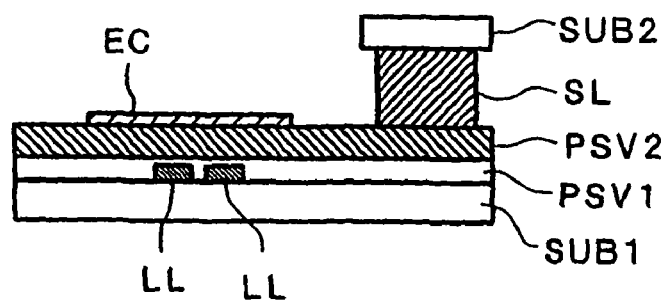

FIGS. 37A and 37B are construction views showing another embodiment which relates to the region in which the gate driver ICs 5 are mounted as well as the vicinity of the region. FIGS. 37A and 37B are views corresponding to FIGS. 36A and 36B.

Unlike the construction shown in FIGS. 36A and 36B, a conductive layer EC is formed on the upper surface of the protective film PSV. The conductive layer EC is formed to cover the interconnection layers LL except the region in which each of the gate driver ICs 5 is formed. The conductive layer EC may also be grounded.

By providing the conductive layer EC, it is possible to take so-called EMI countermeasures. In addition, since the protective film PSV is made of the stacked structure in which the inorganic material layer and the organic material layer are stacked in that order, the coupling of the capacitance of the interconnection layers LL and that of the conductive layer EC is reduced, whereby it is possible to stabilize the potential of the interconnection layers LL.

Embodiment 33

Figure 38A:
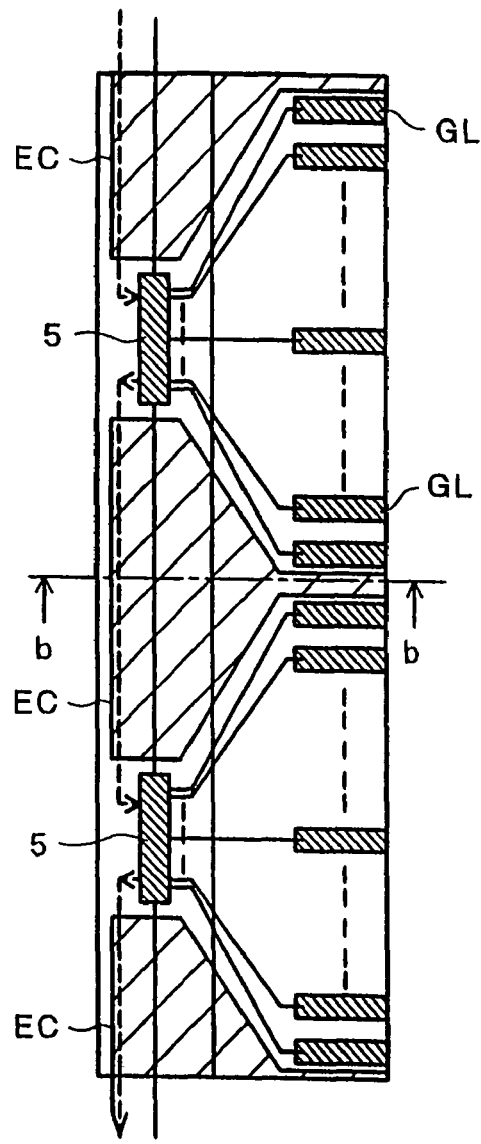
FIGS. 38A and 38B are construction views showing another embodiment of the alignment mark formed in the vicinity of a driver chip mounted in the liquid crystal display device according to the invention.
Figure 38B:
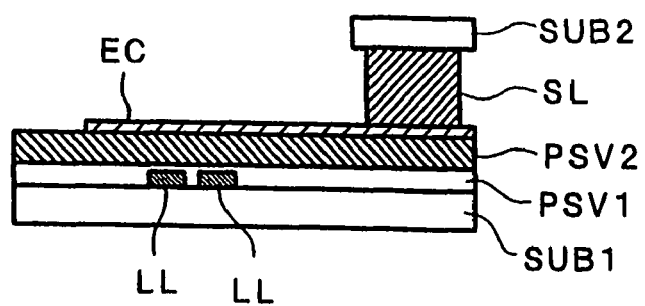

FIGS. 38A and 38B are construction views showing a further improvement in Embodiment 32, and correspond to FIGS. 37A and 37B.

Unlike the construction shown in FIGS. 37A and 37B, the conductive layer EC is formed in such a manner that electrodes formed in the liquid crystal display area AR (for example, the reference electrodes CT shown in FIGS. 1A to 1C) are extended beyond the sealing material SL.

In addition, the conductive layer EC is formed in a pattern formed to extend into a region of comparatively large area except the region in which the gate driver ICs 5 are mounted and the region in which the gate signal lines GL connected to the gate driver ICs 5 are formed.

According to this construction, it is possible to improve the shielding function of the conductive layer EC. Although the conductive layer EC has such a pattern, the conductive layer EC need not necessarily be formed integrally with the electrodes and the like formed in the liquid crystal display area AR.

Embodiment 34

Figure 39A:
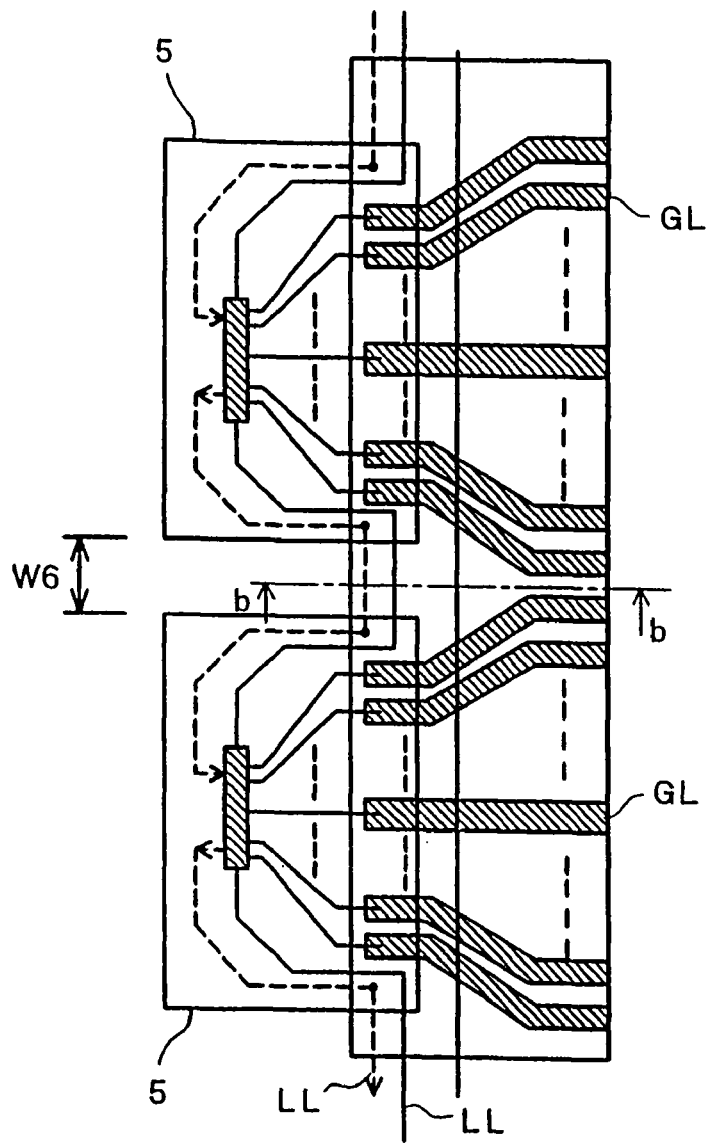
FIGS. 39A and 39B are construction views showing another embodiment of the alignment mark formed in the vicinity of a driver chip mounted in the liquid crystal display device according to the invention.
Figure 39B:
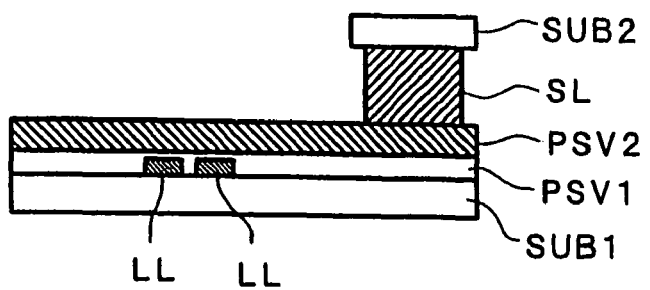

FIGS. 39A and 39B are views showing the construction of the region in which the gate driver ICs 5 are mounted as well as the construction of the vicinity of the region. FIGS. 39A and 39B are views corresponding to FIGS. 36A and 36B.

Unlike the construction shown in FIGS. 36A and 36B, each of the gate driver ICs 5 is a circuit formed by a so-called film carrier method, and is made of a semiconductor IC mounted on a film-like substrate. The input terminals of the gate driver ICs 5 are connected to the corresponding ones of the terminals of a printed circuit board (not shown) disposed in the vicinity of the transparent substrate SUB1, while the output terminals of the gate driver ICs 5 are connected to the corresponding ones of the terminals of the transparent substrate SUB1 (a so-called TCP method).

In this case as well, the interconnection layers LL which connect the gate driver ICs 5 to one another are formed on the film-like substrate and the transparent substrate SUB1. In this case, the connection of the interconnection layers LL on the film-like substrate and the interconnection layers LL on the transparent substrate SUB1 are provided at the time of the mounting of the gate driver ICs 5 to the transparent substrate SUB1.

Incidentally, in this case as well, it goes without saying that the above-described conductive layer EC having the shielding function may also be formed.

Embodiment 35

Figure 40:
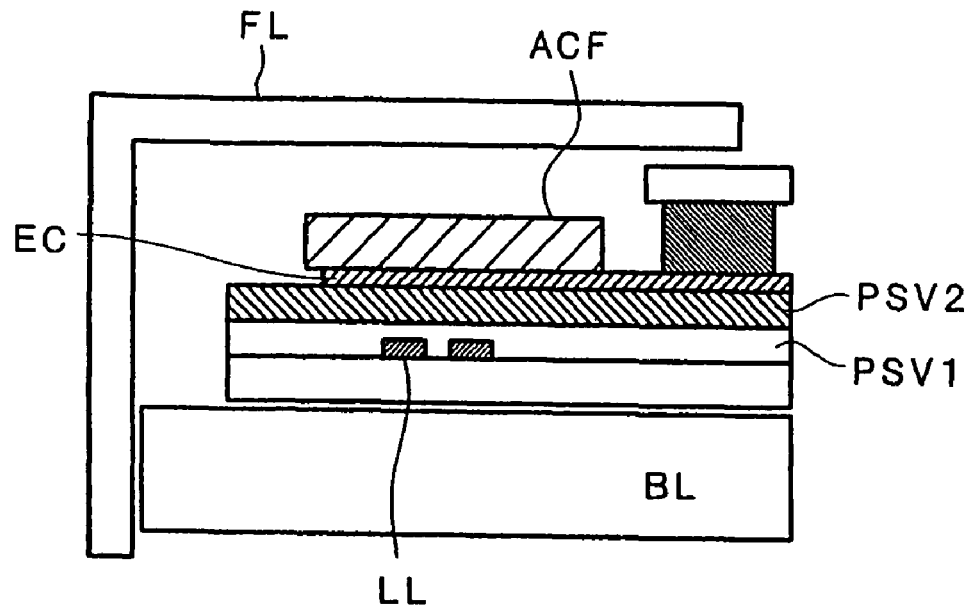
FIG. 40 is a construction view showing one embodiment of the construction of the vicinity of a driver chip in the liquid crystal display device according to the invention, with a frame being shown together with the construction.

FIG. 40 is a view showing a cross section of the vicinity of each of the gate drivers IC 5 (or each of the drain driver ICs 6) mounted in a module in which a backlight BL is disposed at the back of the liquid crystal display panel PNL and a frame FL made of metal is used as an outer frame.

In the vicinity of each of the gate driver ICs 5, the conductive layer EC for EMI countermeasures is formed as shown in FIGS. 37A and 37B or 38A and 38B, and the anisotropic conductive film ACF is deposited to cover the conductive layer EC on the upper surface of the conductive layer EC.

This anisotropic conductive film ACF, when it is not yet subjected to heat treatment, functions as an insulating film, and prevents the conductive layer EC and the frame FL from coming into direct contact with each other.

Since the frame FL is formed to be comparatively thin so that its weight can be reduced as greatly as possible, the frame FL is easily deflected by forces applied from the outside. However, the anisotropic conductive film ACF prevents the frame FL from coming into contact with the conductive layer EC.

Embodiment 36

Figure 41:
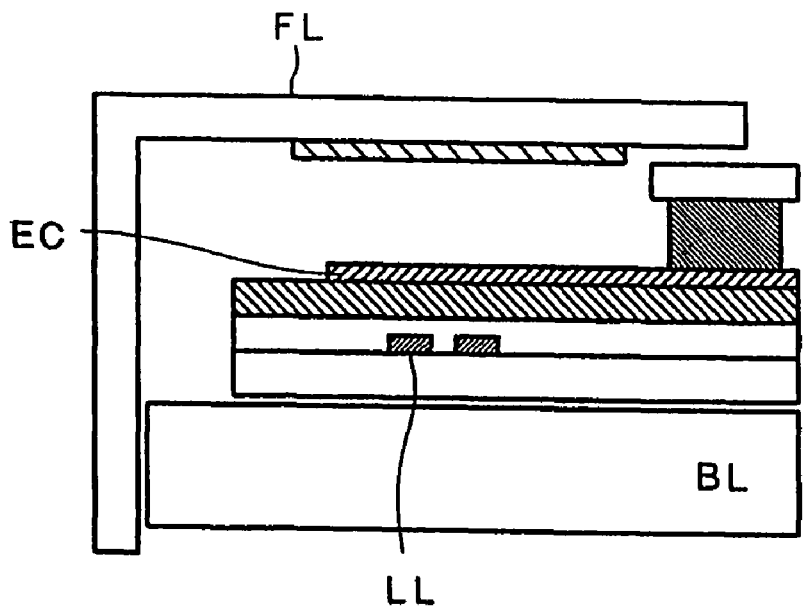
FIG. 41 is a construction view showing another embodiment of the construction of the vicinity of a driver chip in the liquid crystal display device according to the invention, with the frame being shown together with the construction.

FIG. 41 is a view corresponding to FIG. 40. As shown in FIG. 41, an insulating film such as insulating tape is stuck to the surface of the frame FL that is opposed to the conductive layer EC, whereby the conductive layer EC and the frame FL can be prevented from coming into direct contact with each other.

Embodiment 37

Figure 42:
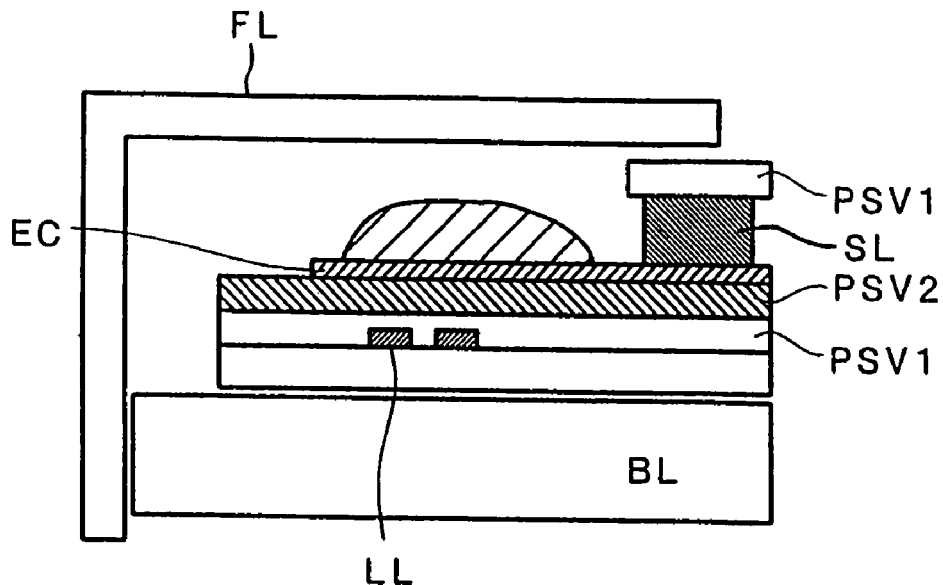
FIG. 42 is a construction view showing another embodiment of the construction of the vicinity of a driver chip in the liquid crystal display device according to the invention, with the frame being shown together with the construction.

FIG. 42 is a view corresponding to FIG. 40. As shown in FIG. 42, a resin film made of epoxy or the like is formed by potting or the like, to cover the conductive layer EC on the upper surface of the conductive layer EC, whereby the conductive layer EC and the frame FL can be prevented from coming into direct contact with each other.

As is apparent from the foregoing description, in accordance with the liquid crystal display device according to the invention, it is possible to reduce light leaks which occur around spacers for ensuring the cell gap.

In addition, it is possible to perform reliable repairs of driver chips mounted on a surface of one of substrates disposed in opposition to each other with a liquid crystal interposed therebetween.

In addition, it is possible to mitigate vibration or shock to be applied to driver chips and prevent malfunction of the driver chips.

In addition, it is possible to solve troubles of bubbles generated in a liquid crystal.

In addition, it is possible to prevent signal lines or the like in indirect contact with the spacers for ensuring the cell gap from being damaged by vibration or shock concentrating on the spacers.

In addition, it is possible to provide reliable alignment marks.

Furthermore, it is possible to form interconnection layers free from damage due to electrolytic corrosion or the like in the vicinity of the region in which the driver chips are mounted.

What is claimed is:

1. A liquid crystal display device comprising:
    a first substrate and a second substrate are disposed in opposition to each other with a liquid crystal interposed therebetween;
    a plurality of gate signal lines and a plurality of drain signal lines formed on the first substrate;
    a plurality of pixel regions each defined by adjacent gate signal lines and drain signal lines of the plurality of gate signal lines and the plurality of drain signal lines respectively, each pixel region including a respective TFT element formed on one of the gate signal lines defining the pixel region and connected to the drain signal lines defining the pixel region,
    a plurality of spacers formed on a liquid crystal side of the second substrate, the plurality of spacers including a spacer in each pixel region;
    wherein each pixel region has a height difference portion formed on a liquid crystal side of one of the gate signal lines defining the pixel region,
    wherein the spacer of each pixel region is formed in opposition to the height difference portion of the pixel region such that a peak of the spacer touches the height difference portion, and
    wherein the height difference portion and the spacer of each pixel region are formed at a different position in the pixel region than the TFT element included in the pixel region.

2. A liquid crystal display device according to claim 1, wherein at least part of an insulating layer intervenes between the gate signal lines and the peak of spacers in each of the pixel regions.

3. A liquid crystal display device according to claim 1, wherein a black matrix is formed on the second substrate, and wherein the spacers are superimposed on the black matrix.

4. A liquid crystal display device according to claim 1, wherein a plurality of pixel electrodes is formed on the first substrate, and wherein a plurality of common electrodes is formed on the second substrate.

* * * * *